United States Patent
Heiss et al.

(10) Patent No.: US 10,906,832 B2
(45) Date of Patent: Feb. 2, 2021

(54) APPARATUSES AND METHODS FOR SYNCHRONOUS MULTI-LASER PROCESSING OF TRANSPARENT WORKPIECES

(71) Applicant: Corning Incorporated, Corning, NY (US)

(72) Inventors: Marina Irmgard Heiss, Penzing (DE); Uwe Stute, Neustadt am Rübenberge (DE); Ralf Joachim Terbrueggen, Neuried (DE)

(73) Assignee: Corning Incorporated, Corning, NY (US)

( * ) Notice: Subject to any disclaimer, the term of this patent is extended or adjusted under 35 U.S.C. 154(b) by 158 days.

(21) Appl. No.: 16/057,284

(22) Filed: Aug. 7, 2018

(65) Prior Publication Data

US 2019/0047894 A1 Feb. 14, 2019

Related U.S. Application Data

(60) Provisional application No. 62/544,208, filed on Aug. 11, 2017.

(51) Int. Cl.
| | | |
|---|---|---|
| *C03B 33/02* | (2006.01) | |
| *B23K 26/06* | (2014.01) | |
| *B23K 26/073* | (2006.01) | |
| *B23K 26/082* | (2014.01) | |
| *B23K 26/067* | (2006.01) | |

(Continued)

(52) U.S. Cl.
CPC ........ *C03B 33/0222* (2013.01); *B23K 26/067* (2013.01); *B23K 26/0608* (2013.01);
(Continued)

(58) Field of Classification Search
None
See application file for complete search history.

(56) References Cited

U.S. PATENT DOCUMENTS 4,914,270 A * 4/1990 Copley ................ B23K 26/073
219/121.68
6,180,915 B1 1/2001 Sugioka et al.
(Continued)

FOREIGN PATENT DOCUMENTS

| JP | 2006175487 A * | 7/2006 | ........... B23K 26/364 |
| WO | 2016010954 A2 | 1/2016 | |

(Continued)

OTHER PUBLICATIONS

JP2006-175487A Google Machine Translation Performed May 22, 2020. (Year: 2020).*
(Continued)

*Primary Examiner* — Lisa L Herring
(74) *Attorney, Agent, or Firm* — Smit Kapadia

(57) ABSTRACT

A method for laser processing a transparent workpiece includes focusing a pulsed laser beam output by a pulsed laser beam source into a pulsed laser beam focal line directed into the transparent workpiece, thereby forming a pulsed laser beam spot on the transparent workpiece and producing a defect within the transparent workpiece, directing an infrared laser beam output onto the transparent workpiece to form an annular infrared beam spot that circumscribes the pulsed laser beam spot at the imaging surface and heats the transparent workpiece. Further, the method includes translating the transparent workpiece and the pulsed laser beam focal line relative to each other along a separation path and translating the transparent workpiece and the annular infrared beam spot relative to each other along the separation path synchronous with the translation of the transparent workpiece and the pulsed laser beam focal line relative to each other.

15 Claims, 9 Drawing Sheets

(51) Int. Cl.
  *B23K 26/53* (2014.01)
  *B23K 26/364* (2014.01)
  *C03B 33/09* (2006.01)
  *B23K 103/00* (2006.01)
(52) U.S. Cl.
  CPC ...... *B23K 26/0734* (2013.01); *B23K 26/0738* (2013.01); *B23K 26/082* (2015.10); *B23K 26/364* (2015.10); *B23K 26/53* (2015.10); *C03B 33/091* (2013.01); *B23K 2103/52* (2018.08); *B23K 2103/54* (2018.08); *B23K 2103/56* (2018.08)

(56) References Cited

U.S. PATENT DOCUMENTS

| 2013/0068736 A1 | 3/2013 | Mielke et al. |
| 2015/0166394 A1* | 6/2015 | Marjanovic ........ B23K 26/0884 428/43 |
| 2015/0360991 A1 | 12/2015 | Grundmueller et al. |
| 2018/0029919 A1 | 2/2018 | Schnitzler et al. |
| 2018/0057390 A1 | 3/2018 | Hackert et al. |

FOREIGN PATENT DOCUMENTS

| WO | 2016062303 A1 | 4/2016 |
| WO | 2017025550 A1 | 2/2017 |
| WO | 2018022476 A1 | 2/2018 |

OTHER PUBLICATIONS

International Search Report and Wrriten Opinion PCT/US2018/045701 dated Jan. 24, 2019, 14 Pgs.

* cited by examiner

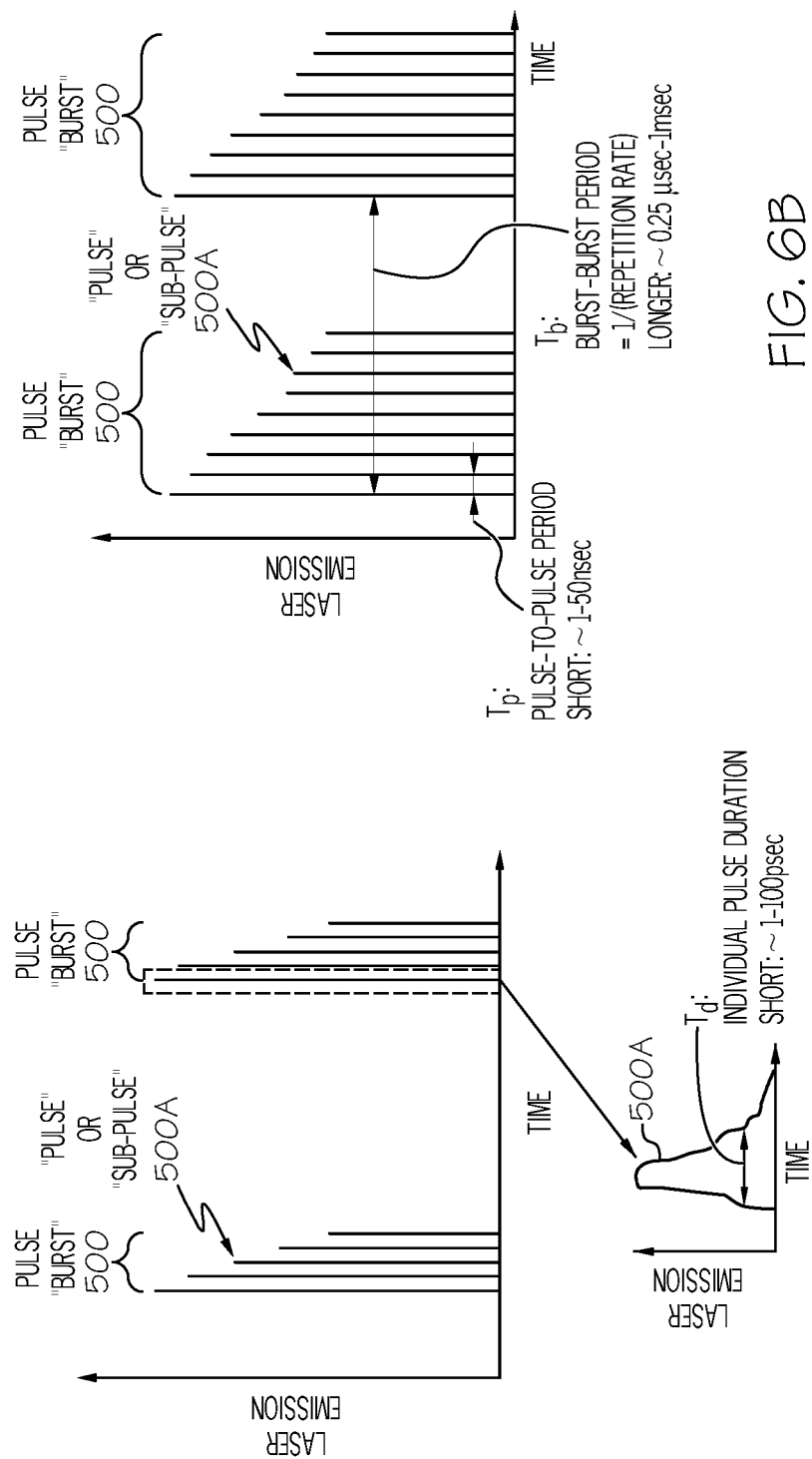

APPARATUSES AND METHODS FOR SYNCHRONOUS MULTI-LASER PROCESSING OF TRANSPARENT WORKPIECES

BACKGROUND

This application claims the benefit of priority under 35 U.S.C. § 119 of U.S. Provisional Application Ser. No. 62/544,208, filed on Aug. 11, 2017, the content of which is relied upon and incorporated herein by reference in its entirety.

Field

The present specification generally relates to apparatuses and methods for laser processing transparent workpieces, and more particularly, to separating transparent workpieces.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable and more reliable method of separating glass substrates than what is currently practiced in the market. Accordingly, a need exists for alternative improved methods for separating glass substrates.

SUMMARY

According to one embodiment, a method for laser processing a transparent workpiece includes focusing a pulsed laser beam output by a pulsed laser beam source into a pulsed laser beam focal line oriented along a beam propagation direction and directed into the transparent workpiece, thereby forming a pulsed laser beam spot on an imaging surface of the transparent workpiece. The pulsed laser beam focal line generates an induced absorption within the transparent workpiece and the induced absorption produces a defect along the pulsed laser beam focal line within the transparent workpiece. The method also includes directing an infrared laser beam output by an infrared beam source onto the transparent workpiece such that the infrared laser beam forms an annular infrared beam spot on the imaging surface. The annular infrared beam spot circumscribes the pulsed laser beam spot at the imaging surface and the infrared laser beam heats the transparent workpiece. Further, the method includes translating the transparent workpiece and the pulsed laser beam focal line relative to each other along a separation path, thereby laser forming a plurality of defects that define a contour line within the transparent workpiece along the separation path and translating the transparent workpiece and the annular infrared beam spot relative to each other along the separation path synchronous with the translation of the transparent workpiece and the pulsed laser beam focal line relative to each other, such that the annular infrared beam spot circumscribes the pulsed laser beam spot during relative motion of the transparent workpiece and the pulsed laser beam focal line and irradiates the transparent workpiece along or near the contour line to separate the transparent workpiece along the contour line.

In another embodiment, a method for laser processing a transparent workpiece, the method includes focusing a pulsed laser beam output by a pulsed laser beam source into a pulsed laser beam focal line oriented along a beam propagation direction and directed into the transparent workpiece, thereby forming a pulsed laser beam spot on an imaging surface of the transparent workpiece. The pulsed laser beam focal line generates an induced absorption within the transparent workpiece and the induced absorption produces a defect along the pulsed laser beam focal line within the transparent workpiece. The method also includes directing an infrared laser beam output by an infrared beam source onto the transparent workpiece such that the infrared laser beam forms an infrared beam spot on the imaging surface. The infrared beam spot is spaced a spacing distance from the pulsed laser beam spot at the imaging surface and the infrared laser beam heats the transparent workpiece. Further, the method includes translating the transparent workpiece and the pulsed laser beam focal line relative to each other along a separation path, thereby laser forming a plurality of defects that define a contour line within the transparent workpiece along the separation path and translating the transparent workpiece and the infrared beam spot relative to each other along the separation path synchronous with the translation of the transparent workpiece relative to the pulsed laser beam focal line such that the pulsed laser beam spot remains spaced the spacing distance from the infrared beam spot during relative motion of the transparent workpiece and the pulsed laser beam focal line and irradiates the transparent workpiece along or near the contour line to separate the transparent workpiece along the contour line.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5B-2 schematically depicts a second embodiment of a pulsed beam laser focal line in relationship to a transparent workpiece, according to one or more embodiments described herein;

FIG. 5B-3 schematically depicts a third embodiment of a pulsed beam laser focal line in relationship to a transparent workpiece, according to one or more embodiments described herein;

FIG. 5B-4 schematically depicts a fourth embodiment of a pulsed beam laser focal line in relationship to a transparent workpiece, according to one or more embodiments described herein;

FIG. 6A graphically depicts the relative intensity of laser pulses within an exemplary pulse burst vs. time, with each exemplary pulse burst having 7 pulses, according to one or more embodiments described herein; and FIG. 6B graphically depicts relative intensity of laser pulses vs. time within an exemplary pulse burst, with each exemplary pulse burst containing 9 pulses, according to one or more embodiments described herein.

DETAILED DESCRIPTION

Figure 1A:
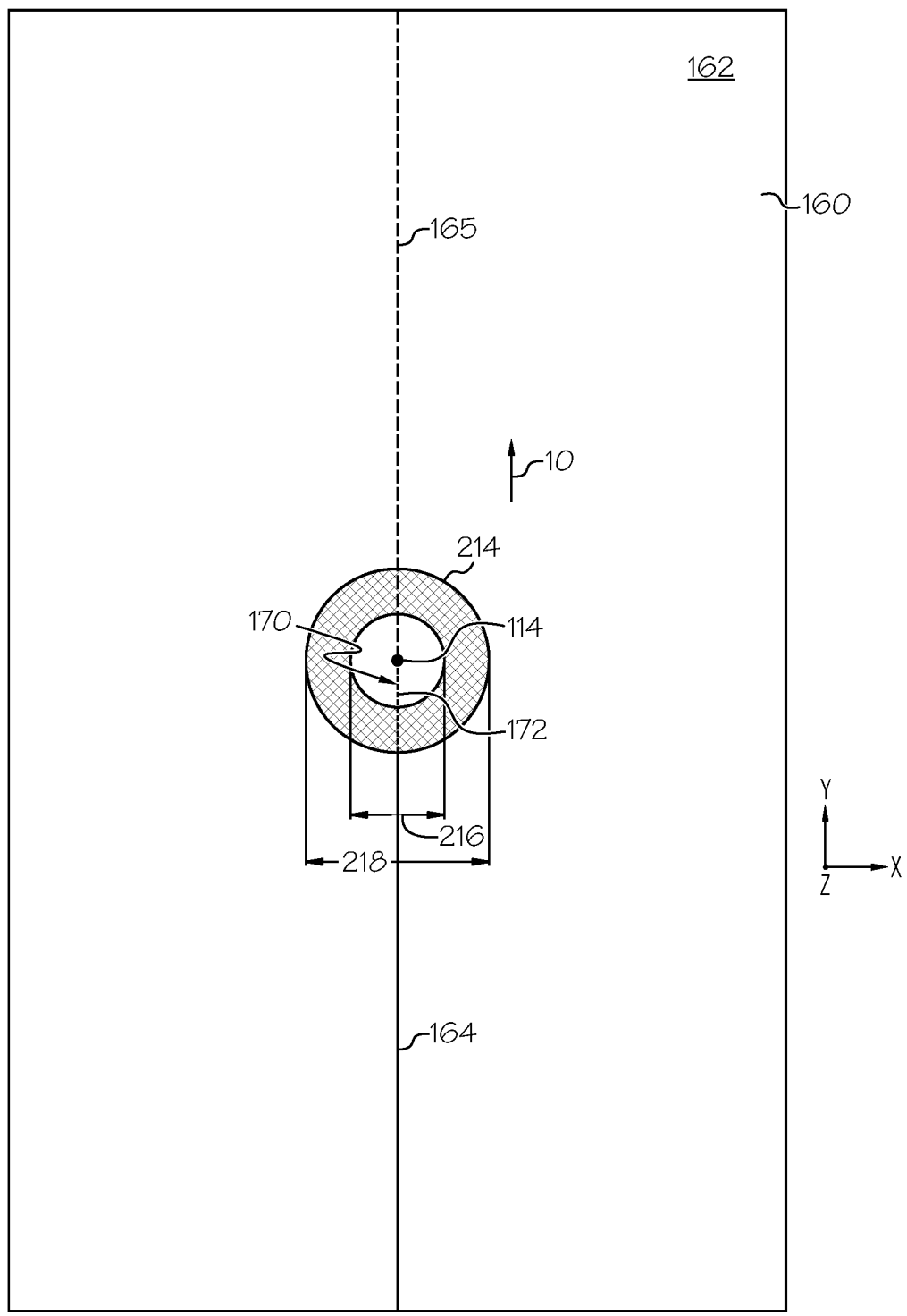
FIG. 1A schematically depicts a pulsed laser beam spot circumscribed by an infrared beam spot, where each are traversing a separation path of a transparent workpiece, according to one or more embodiments described herein.

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts. According to one or more embodiments described herein, a transparent workpiece may be laser processed to separate the transparent workpiece into two or more portions. Generally, the process involves at least a forming a contour line comprising defects in the transparent workpiece, and separating the transparent workpiece along the contour line by subjecting the transparent workpiece to an infrared laser beam at or near the contour line. For example, a pulsed laser beam may be utilized to create a series of defects in the transparent workpiece thereby defining the contour line. These defects may be referred to herein as perforations or nano-perforations in the transparent workpiece.

The infrared laser may then be utilized to heat the area of the transparent workpiece adjacent and/or along the contour line to separate the transparent workpiece at the contour line. Separation along the contour line may be caused by mechanical stresses in the transparent workpiece caused by differences in the temperature of the transparent workpiece at its different portions caused by the heating from the infrared laser beam. Further, in the embodiments described herein, laser forming the plurality of defects and heating these defects with the infrared laser beam may occur in a single, synchronized step. In some embodiments, the infrared laser beam may form an infrared beam spot on the transparent workpiece (which in some embodiments may be an annular infrared beam spot) and the pulsed laser beam may be directed into the transparent workpiece such that the infrared beam spot (e.g., an annular infrared beam spot) surrounds (e.g., circumscribes) a pulsed laser beam spot form by the pulsed laser beam on an imaging surface of the transparent workpiece. In other embodiments, the infrared laser beam may form the infrared beam spot on the transparent workpiece and the pulsed laser beam may be directed into the transparent workpiece such that the pulsed laser beam spot formed by the pulsed laser beam is spaced apart from the infrared laser beam by a spacing distance. In each of these embodiments, the defect line is formed by the pulsed laser beam and separated by the infrared laser beam and the transparent workpiece is separated along the defect line by synchronous relative motion between the transparent workpiece and both the pulsed laser beam and the infrared laser beam. Various embodiments of methods and apparatuses for separating a transparent workpiece will be described herein with specific reference to the appended drawings.

According to one or more embodiments, the present disclosure provides methods for processing transparent workpieces. As used herein, "laser processing" may include forming contour lines in transparent workpieces, separating transparent workpieces, or combinations thereof. The phrase "transparent workpiece," as used herein, means a workpiece formed from glass, glass-ceramic, or a semiconductor material, which are transparent, where the term "transparent," as used herein, means that the material has an optical absorption of less than about 10% per mm of material depth, such as less than about 1% per mm of material depth for the specified pulsed laser wavelength. According to some embodiments, at least a portion of the transparent workpiece, such as the portion which is separated, has a coefficient of thermal expansion of less than about $5 \times 10^{-6}$/K, such as less than about $4 \times 10^{-6}$/K, or less than about $3.5 \times 10^{-6}$/K. For example, the transparent workpiece may have a coefficient of thermal expansion of about $3.2 \times 10^{-6}$/K. The transparent workpiece may have a thickness of from about 50 microns to about 10 mm (such as from about 100 microns to about 5 mm, or from about 0.5 mm to about 3 mm.

Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments, the glass may be ion-exchangeable, such that the glass composition can undergo ion-exchange for mechanical strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion exchangeable glasses may have coefficients of thermal expansion (CTE) of from about 6 ppm/° C. to about 10 ppm/° C. In some embodiments, the glass composition of the transparent workpiece may include greater than about 1.0 mol. % boron and/or compounds containing boron, including, without limitation, $B_2O_3$. In another embodiment, the glass compositions from which the transparent workpieces are formed include less than or equal to about 1.0 mol. % of oxides of boron and/or compounds containing boron. Moreover, the transparent workpiece may comprise other components which are transparent to the wavelength of the laser, for example, crystals such as sapphire or zinc selenide.

Some transparent workpieces may be utilized as display and/or TFT (thin film transistor) substrates. Some examples of such glasses or glass compositions suitable for display or TFT use are EAGLE XG®, CONTEGO, and CORNING LOTUS™ available from Corning Incorporated of Corning, N.Y. The alkaline earth boro-aluminosilicate glass compositions may be formulated to be suitable for use as substrates for electronic applications including, without limitation, substrates for TFTs. The glass compositions used in conjunction with TFTs typically have CTEs similar to that of silicon (such as less than $5 \times 10^{-6}$/K, or even less than $4 \times 10^{-6}$/K, for example, approximately $3 \times 10^{-6}$/K, or about $2.5 \times 10^{-6}$/K to about $3.5 \times 10^{-6}$/K), and have low levels of alkali within the glass. Low levels of alkali (e.g., trace amounts of about 0 wt. % to 2 wt. %, such as less than 1 wt. %, for example, less than 0.5 wt. %) may be used in TFT applications because alkali dopants, under some conditions, leach out of glass and contaminate or "poison" the TFTs, possibly rendering the TFTs inoperable. According to embodiments, the laser cutting processes described herein may be used to separate transparent workpieces in a controlled fashion with negligible debris, minimum defects, and low subsurface damage to the edges, preserving workpiece integrity and strength.

The phrase "contour line," as used herein, denotes a line (e.g., a line, a curve, etc.) of intended separation on the surface of a transparent workpiece along which the transparent workpiece will be separated into multiple portions upon exposure to the appropriate processing conditions. The contour line generally consists of one or more defects introduced into the transparent workpiece using various techniques. As used herein, a "defect" may include an area of modified material (relative to the bulk material), void space, scratch, flaw, hole, or other deformalities in the transparent workpiece, which may be formed by irradiating the transparent workpiece with a pulsed laser beam. The defects of the contour line enable separation of the transparent workpiece along the contour line by an additional heat treatment, such as by infrared laser processing (as described herein), mechanical stress, or a spontaneous break occurring without further heating or mechanical separation steps, due to stress present in the transparent workpiece 160, depending on the type, thickness, and structure of the transparent workpiece 160 (for example, a transparent workpiece 160 having a high CTE may undergo spontaneous break after formation of the contour line). Further, as also used herein the "imaging surface" of the transparent workpiece is the surface of the transparent workpiece at which the pulsed laser beam initially contacts the transparent workpiece.

A transparent workpiece, such as a glass substrate or the like, may be separated into multiple portions by forming a contour line on the surface of the transparent workpiece and, thereafter heating the surface of the transparent workpiece along the contour line to create thermal stresses in the transparent workpiece. The stresses ultimately lead to the separation (e.g., spontaneous separation) of the transparent workpiece along the contour line. Heating the surface of the transparent workpiece may be carried out, for example, using an infrared laser. Moreover, formation of the contour line comprising defects and heating the surface of the transparent workpiece along the contour line may be by synchronous relative motion between the transparent workpiece and both the pulsed laser beam and the infrared laser beam. By synchronizing the formation of the contour line with the subsequent heating of the contour line, the laser processing time for separating the transparent workpiece (e.g., the tact time) may be reduced, for example, halved.

Figure 1B:
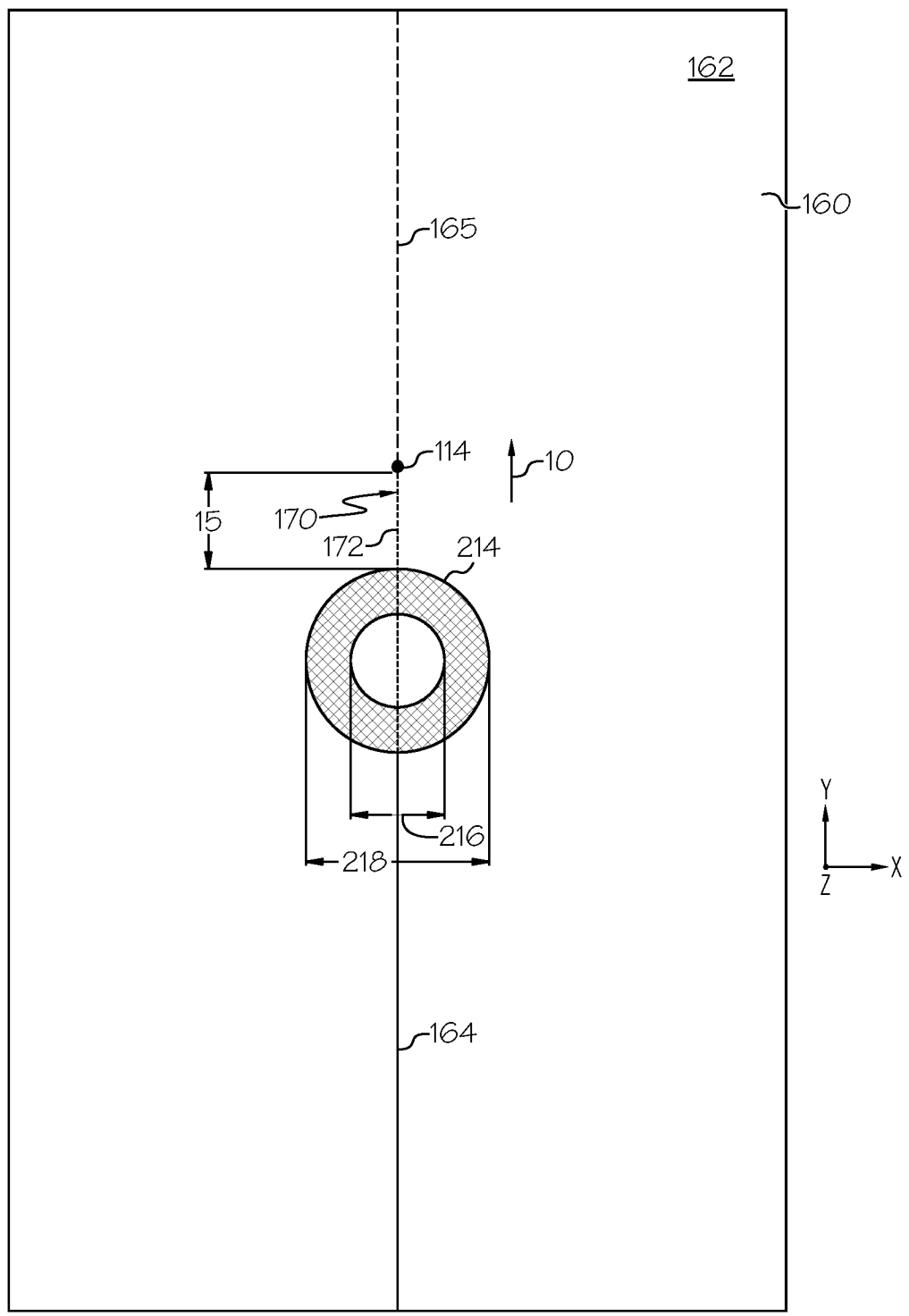
FIG. 1B schematically depicts a pulsed laser beam spot offset from an infrared beam spot, where each are traversing a separation path of a transparent workpiece, according to one or more embodiments described herein.

Referring now to FIGS. 1A and 1B, by way of example, a transparent workpiece 160, such as a glass workpiece or a glass-ceramic workpiece, is schematically depicted undergoing synchronized defect formation and separation according to the methods described herein. As depicted, a contour line 170 is formed in the transparent workpiece 160 along a separation path 165, which is a line of intended separation about which the transparent workpiece 160 will be separated into two or more portions. The contour line 170 comprises a series of defects 172 in the transparent workpiece 160 and each defect 172 may be formed by directing a pulsed laser beam focal line 113 (FIGS. 2 and 3) into the transparent workpiece 160. The pulsed laser beam focal line 113 comprises a portion of a pulsed laser beam 112 (FIGS. 2 and 3), which forms a pulsed laser beam spot 114 on an imaging surface 162 of the transparent workpiece 160. Some example methods and apparatuses for forming a "perforated" contour line (e.g., forming the contour line 170 in the transparent workpiece 160) are disclosed in U.S. Patent Application Publication No. 2015/0360991, published Dec. 17, 2015, incorporated herein by reference in its entirety. While the contour line 170 is depicted in FIGS. 1A and 1B as being substantially linear, it should be understood that other configurations are contemplated and possible including, without limitation, curves, patterns, regular geometric shapes, irregular shapes, and the like. As noted herein, the defects 172 of the contour line 170 which may be heated by an infrared laser beam 212 (FIGS. 2A, 2B, and 3) to induce separation of the transparent workpiece 160 along the contour line 170. As depicted in FIGS. 1A and 1B, the infrared laser beam 212 forms an infrared beam spot 214 on the imaging surface 162 of the transparent workpiece 160.

The contour line 170 may comprise line shaped defects, (e.g., defects 172) that extend within the transparent workpiece 160, for example, extend from the imaging surface 162 into the transparent workpiece 160, and delineate the desired shape of the separated workpiece and establish a path for crack propagation and, hence, separation of the transparent workpiece 160 into separate portions along the contour line 170. To form the contour line 170, the transparent workpiece 160 may be irradiated with the pulsed laser beam 112 (FIGS. 2A, 2B, and 3), which may comprise an ultra-short pulsed (i.e., having a pulse width less than 100 psec) laser beam at wavelengths at or below 1064 nm that is condensed into a high aspect ratio line focus (i.e. the pulsed laser beam focal line 113 of FIGS. 2A, 2B, and 3) that penetrates through at least a portion of the thickness of the transparent workpiece 160. Within this volume of high energy density, the material of the transparent workpiece 160 along the contour line 170 is modified via nonlinear effects (e.g., by two photon absorption), specifically creating defects 172 in the material of the transparent workpiece 160. By scanning the pulsed laser beam 112 over a desired line or path (i.e. the separation path 165), narrow line defects (e.g., a few microns wide) defining the contour line 170 may be formed. This contour line 170 may define the perimeter or shape to be separated from the transparent workpiece 160 in a subsequent heating step.

Referring now to FIGS. 1A-3, synchronized with the formation of the contour line 170 in the transparent workpiece 160, a thermal source, such as the infrared laser beam 212, may be utilized to separate the transparent workpiece 160 along the contour line 170. According to embodiments, the thermal source may be used to create thermal stress and thereby separate the transparent workpiece 160 at the contour line 170. As described in more detail below, relative movement of the infrared laser beam 212 along the contour line 170 may be synchronized with relative movement of the pulsed laser beam 112 along the separation path 165 such that formation and separation of the contour line 170 may occur in a single pass (i.e. a single, synchronized traversal of the pulsed laser beam 112 and the infrared laser beam 212 along the separation path 165).

The infrared laser beam 212 comprises a laser beam produced by an infrared laser beam source 210, such as a carbon dioxide laser (a "$CO_2$ laser"), a carbon monoxide laser (a "CO laser"), a solid state laser, a laser diode, or combinations thereof, is a controlled heat source that rapidly increases the temperature of the transparent workpiece 160 at or near the contour line 170. This rapid heating may build compressive stress in the transparent workpiece 160 on or adjacent to the contour line 170. Since the area of the heated glass surface is relatively small compared to the overall surface area of the transparent workpiece 160, the heated area cools relatively rapidly. The resultant temperature gradient induces tensile stress in the transparent workpiece 160 sufficient to propagate a crack along the contour line 170 and through the thickness of the transparent workpiece 160, resulting in full separation of the transparent workpiece 160 along the contour line 170. Without being bound by theory, it is believed that the tensile stress may be caused by expansion of the glass (i.e., changed density) in portions of the transparent workpiece 160 with higher local temperature.

Referring still to FIGS. 1A-3, in the embodiments described herein, the infrared laser beam 212 may be directed onto the transparent workpiece 160 (thereby projecting the infrared beam spot 214 onto the transparent workpiece 160) and translated relative to the transparent workpiece 160 along the contour line 170 in a processing direction 10. In operation, a separated portion 164 of the contour line 170 is formed by heating the contour line 170 with the infrared laser beam 212 (e.g., by traversing the infrared beam spot 214), thereby causing a crack to propagate along the contour line 170 and through its thickness causing separation to occur. The separated portion 164 of the contour line 170 trails the infrared beam spot 214 as it moves in the processing direction 10. According to one or more embodiments, the infrared laser beam 212 may be translated across the transparent workpiece 160 by motion of the transparent workpiece 160, motion of the infrared laser beam 212 (i.e., motion of the infrared beam spot 214), or motion of both the transparent workpiece 160 and the infrared laser beam 212. By translating the infrared beam spot 214 relative to the transparent workpiece 160, the transparent workpiece 160 may be separated along the contour line 170.

While not intending to be limited by theory, heating the transparent workpiece 160 on both sides of the contour line 170 creates the thermal stress to facilitate separation of the transparent workpiece 160 along the contour line 170. However, while the total amount of energy imparted to the transparent workpiece 160 to facilitate separation along the contour line 170 may be the same as if the infrared laser beam 212 was focused with maximum intensity directly on the contour line 170 (e.g., a Gaussian beam profile), heating the transparent workpiece on both sides of the contour line 170 rather than with maximum intensity directly on the contour line 170 spreads the total amount of thermal energy over a larger area, thereby mitigating the formation of cracks lateral to the contour line 170 due to overheating and also reducing or even mitigating melting of the material of the transparent workpiece 160 adjacent to or at the contour line 170. Indeed, heating the transparent workpiece 160 with maximum intensity on both sides of the contour line 170 rather than with maximum intensity directly on the contour line 170 may actually allow for a greater amount of total thermal energy to be introduced into the transparent workpiece 160 without the formation of undesired lateral cracks and/or melting, thereby enabling laser separation of transparent workpieces 160 formed from materials having relatively low CTEs.

In some embodiments, the infrared beam spot 214 of infrared laser beam 212 used to facilitate separation may comprise an annular beam profile (e.g., an annular infrared beam spot), such as the circular symmetric beam profile depicted in FIGS. 1A and 1B, in order to transfer a greater amount of energy onto the areas adjacent the contour line 170 than directly onto the contour line 170 and also allow the infrared beam spot 214 to circumscribe the pulsed laser beam 112 at the imaging surface 162 of the transparent workpiece 160 (i.e. circumscribe the pulsed laser beam spot 114 in the embodiment depicted in FIG. 1A). Thus, the infrared beam spot 214 facilitates synchronous formation and separation of the transparent workpiece 160 along the contour line 170. As depicted in FIGS. 1A and 1B, in embodiments in which the infrared beam spot 214 comprises an annular infrared beam spot, the infrared beam spot 214 comprises an inner diameter 216 and an outer diameter 218. Further, as used herein, an annular beam profile (e.g., of the annular infrared beam spot) refers to any laser beam profile which generally has a maximum intensity away from the center of the beam and has an intensity trough at its center relative to the maximum intensity. The trough may include complete lack of energy at the center of the beam, (i.e. the intensity of the beam is 0 at its center). Moreover, while the infrared beam spot 214 is depicted in FIGS. 1A and 1B as comprising a circular annulus (e.g., circularly symmetric relative to the contour line 170), it should be understood that other annular beam profiles are contemplated, such as an oval shape, an elliptical shape, a Lissajous pattern, a plurality of discrete spots, a plurality of rings, or the like. Further, it should be understood that in some embodiments, the infrared beam spot 214 may comprise non-annular shapes such as a Gaussian beam spot comprising that does not include the inner diameter 216 and projects laser energy at substantially all locations within the outer diameter 218.

Referring again to FIGS. 1A and 1B, synchronous formation of the defects 172 of the contour line 170 may comprise synchronous relative motion between the transparent workpiece 160 and both the pulsed laser beam spot 114 and the infrared beam spot 214 in arrangements in which the pulsed laser beam spot 114 and the infrared beam spot 214 are positioned near one another along the separation path 165. To facilitate synchronous relative motion, the pulsed laser beam spot 114 (and thereby the pulsed laser beam focal line 113) may be translated at a speed that is equal the speed of relative motion between the infrared beam spot 214 and the transparent workpiece 160. For example, relative translation between the transparent workpiece 160 and each of the infrared beam spot 214 and the pulsed laser beam spot 114 may be from about 1 mm/s to about 10 m/s, such as about 2 mm/s, 5 mm/s, 10 mm/s, 25 mm/s, 50 mm/s, 75 mm/s, 100 mm/s, 250 mm/s, 500 mm/s, 750 mm/s, 1 m/s, 2.5 m/s, 5 m/s, 7.5 m/s, or the like.

As depicted in FIG. 1A, in some embodiments, the infrared beam spot 214 may comprise an annular infrared beam spot and may circumscribe the pulsed laser beam spot 114 on the imaging surface 162 of the transparent workpiece 160, as depicted in FIG. 1A. When the infrared beam spot 214 circumscribes the pulsed laser beam spot 114, synchronous formation and separation of the transparent workpiece 160 along the contour line 170 comprises translating the transparent workpiece 160 and the infrared beam spot 214 relative to each other along the separation path 165 (e.g., in the processing direction 10) synchronous with the translation of the transparent workpiece 160 and the pulsed laser beam spot 114 (and thereby the pulsed laser beam focal line 113) relative to each other, such that the infrared beam spot 214 circumscribes the pulsed laser beam spot 114 during relative motion of the transparent workpiece 160 and the pulsed laser beam spot 114 (and thereby the pulsed laser beam focal line 113). In the embodiment depicted in FIG. 1A, the pulsed laser beam spot 114 and the infrared beam spot 214 are coaxial (i.e. each share a common center point). However, it should be understood that the pulsed laser beam spot 114 may be positioned at any location within the inner diameter 216 of the infrared beam spot 214 while still circumscribing the pulsed laser beam spot 114. Further, in some embodiments, the pulsed laser beam spot 114 may be positioned within the inner diameter 126 of the infrared beam spot 214 such that the pulsed laser beam spot 114 and the nearest portion of the infrared beam spot 214 is about 3 mm from the pulsed laser beam spot 114 or more, for example, 4 mm or more 5 mm or more 6 mm or more, or the like.

Referring now to FIG. 1B, in some embodiments, the infrared beam spot 214 may be spaced a spacing distance 15 from the pulsed laser beam spot 114, such that the infrared beam spot 214 trails the pulsed laser beam spot 114 along the processing direction 10. The spacing distance 15 between the pulsed laser beam spot 114 and the infrared beam spot 214 may be from about 1 µm and about 100 mm, for example, about 2 µm, 5 µm, 10 µm, 25 µm, 50 µm, 100 µm, 250 µm, 500 µm, 1 mm, 2 mm, 5 mm, 10 mm, 25 mm, 50 mm, 75 mm, or the like. When the infrared beam spot 214 is spaced apart from the pulsed laser beam spot 114 by the spacing distance 15, synchronous formation and separation of the transparent workpiece 160 along the contour line 170 comprises translating the transparent workpiece 160 and the infrared beam spot 214 relative to each other along the separation path 165 (e.g., in the processing direction 10) synchronous with the translation of the transparent workpiece 160 and the pulsed laser beam spot 114 (and thereby the pulsed laser beam focal line 113) relative to each other such that the infrared beam spot 214 remains spaced the spacing distance 15 from the pulsed laser beam spot 114 from during relative motion of the transparent workpiece 160 and the pulsed laser beam spot 114 (and thereby the pulsed laser beam focal line 113) and irradiates the transparent workpiece 160 along or near the contour line 170 to separate the transparent workpiece 160 along the contour line 170. Further, while the infrared beam spot 214 is depicted as an annular infrared beam spot in FIG. 1B, in embodiments in which the infrared beam spot 214 is spaced a spacing distance 15 from the pulsed laser beam spot 114, the infrared beam spot 214 may comprise a non-annular shape, for example, a Gaussian beam spot.

While FIGS. 1A and 1B depict embodiments in which the pulsed laser beam spot 114 and the infrared beam spot 214 do not overlap on the imaging surface 162 of the transparent workpiece 160, in other embodiments, the pulsed laser beam spot 114 and the infrared beam spot 214 may overlap. For example, in embodiments in which the transparent workpiece 160 comprises a low CTE, the pulsed laser beam spot 114 and the infrared beam spot 214 may overlap and synchronous formation and separation of the transparent workpiece 160 along the contour line 170 may comprise translating the transparent workpiece 160 and the infrared beam spot 214 relative to each other along the separation path 165 (e.g., in the processing direction 10) synchronous with the translation of the transparent workpiece 160 and the pulsed laser beam spot 114 (and thereby the pulsed laser beam focal line 113) relative to each other while the infrared beam spot 214 retains an overlap with the pulsed laser beam spot 114. While not intending to be limited by theory, when the transparent workpiece 160 comprises a low CTE, interference between the pulsed laser beam 112 and the infrared laser beam 212 at the transparent workpiece 160 is minimized, minimizing unwanted alterations of the refractive index of local portions of the transparent workpiece 160 irradiated by the infrared laser beam 212 and the pulsed laser beam 112.

Referring again to FIGS. 1A and 1B, the inner diameter 216 is defined as twice the distance (i.e., a radius) where 86% of the beam energy is outside of that distance from the center of the beam. Similarly, the outer diameter 218 is defined as twice the distance (i.e., a radius) where 86% of the beam energy is inside of that distance from the beam center. According to embodiments, the outer diameter 218 may be from about 0.5 mm to about 30 mm, such as from about 1 mm to about 10 mm, from about 2 mm to about 8 mm, or from about 3 mm to about 6 mm. The inner diameter 216 may be from about 0.01 mm to about 15 mm, from about 0.1 mm to about 10 mm, or from about 0.7 mm to about 3 mm. For example, the inner diameter 216 may be from about 5% to about 95% of the outer diameter 218, such as from about 10% to about 50%, from about 20% to about 45%, or from about 30% to about 40% of the outer diameter 218. According to some embodiments, the maximum power from the infrared laser beam 212 (as well as maximum temperature in the transparent workpiece 160) may be at a distance from the contour line 170 about equal to about the half the inner diameter 216.

Figure 2A:
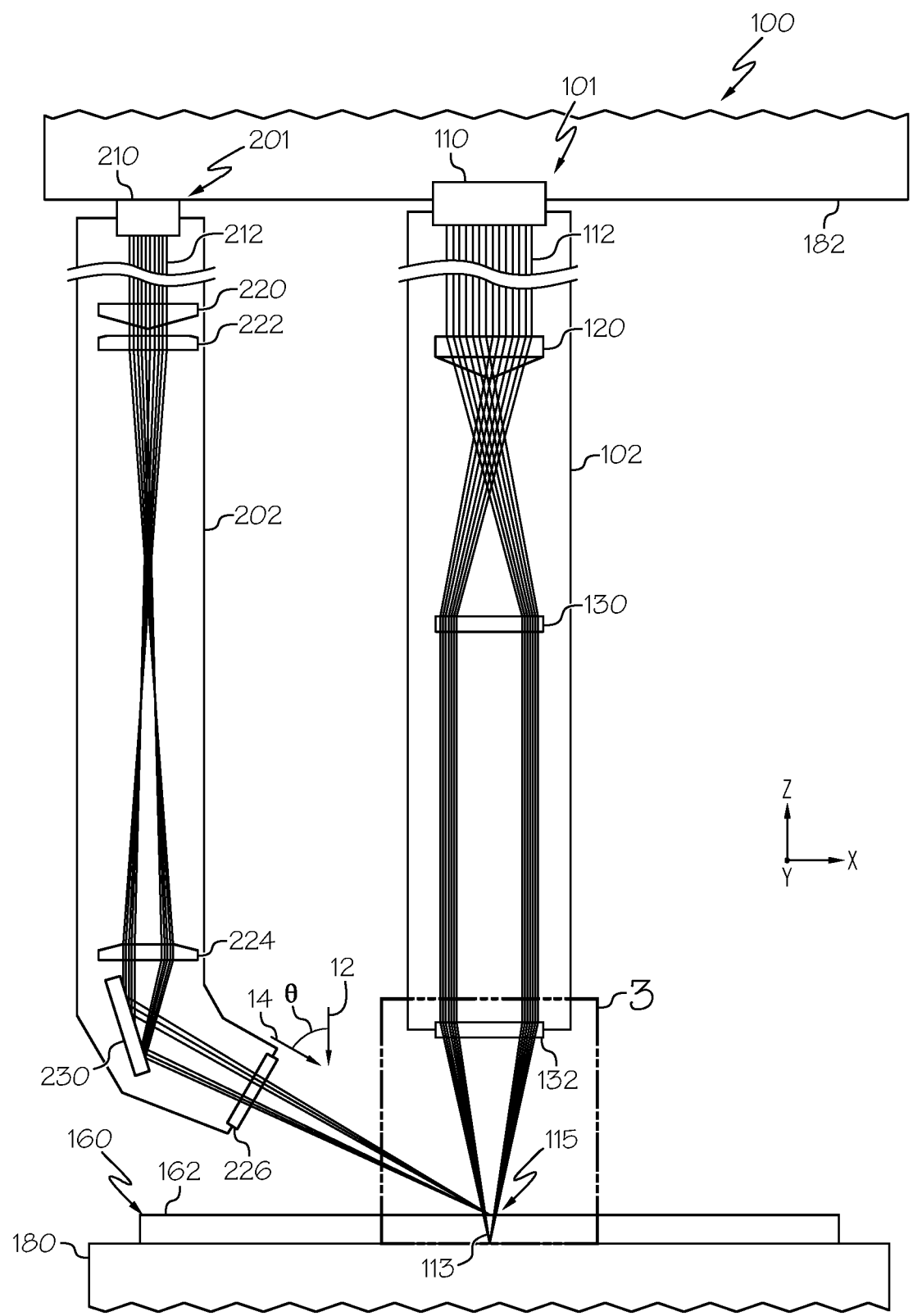
FIG. 2A schematically depicts an optical system comprising a pulsed beam optical assembly and an infrared optical assembly for laser processing a transparent workpiece, according to one or more embodiments described herein.
Figure 2B:
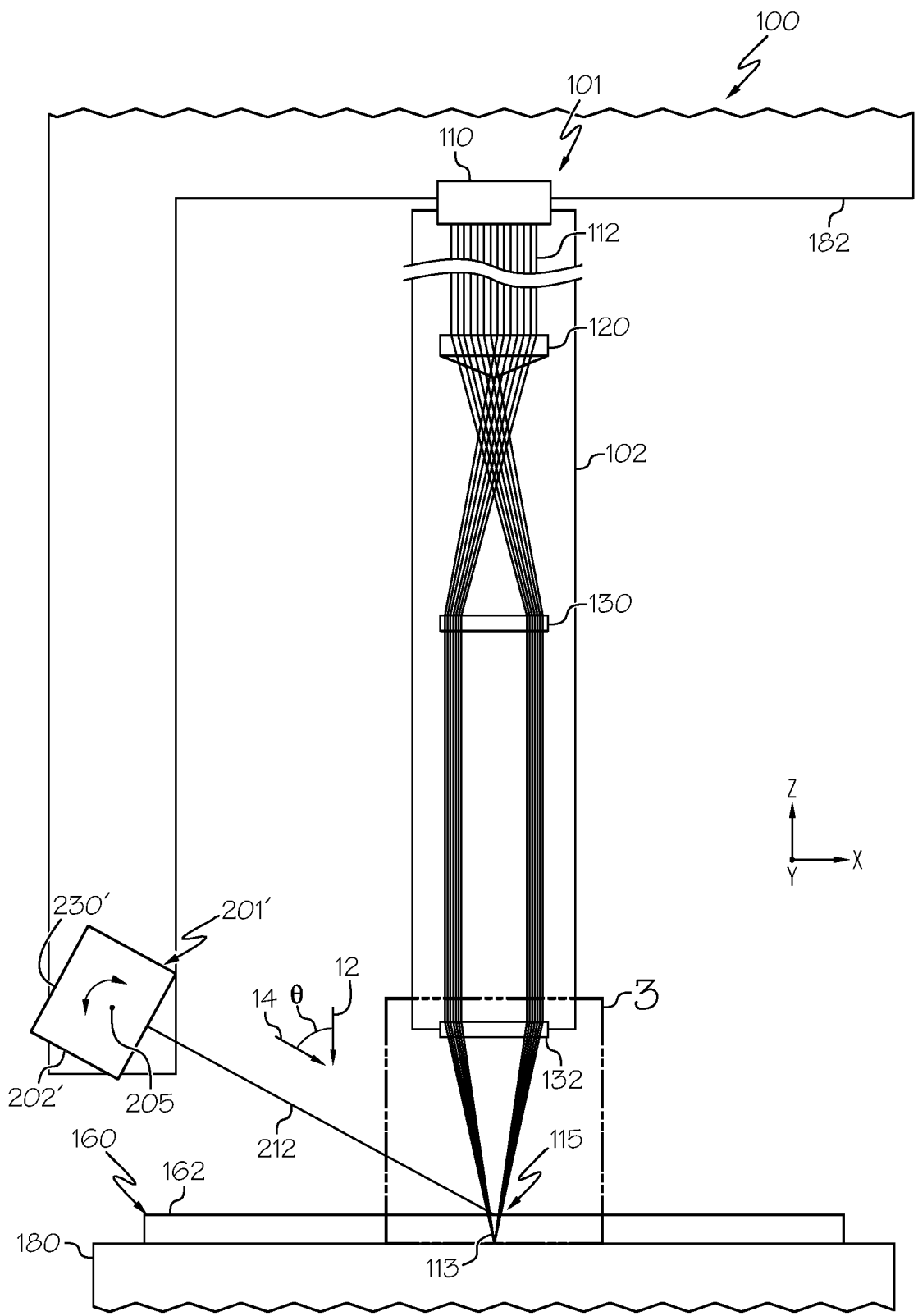
FIG. 2B schematically depicted an optical system comprising the pulsed beam optical assembly of FIG. 2A and another infrared optical assembly for laser processing a transparent workpiece, according to one or more embodiments described herein.

Referring now to FIGS. 2A and 2B, an optical system 100 for synchronous formation and separation of the contour line 170 is schematically depicted. The optical system 100 comprises a pulsed beam optical assembly 101 and an infrared beam optical assembly 201 (FIG. 2A) or 201' (FIG. 2B). The pulsed beam optical assembly 101 comprises a pulsed laser beam source 110 and one or more optical components for forming the pulsed laser beam 112 into a pulsed laser beam focal line 113 such that the pulsed laser beam focal line 113 may form the defects 172 of the contour line 170 in the transparent workpiece 160. The infrared beam optical assembly 201, 201' comprises the infrared laser beam source 210 (not shown in FIG. 2B) for generating the infrared laser beam 212 and comprises one or more optical components for directing the infrared laser beam 212 onto the imaging surface 162 of the transparent workpiece 160. As depicted in FIG. 2A and 2B, the pulsed beam optical assembly 101 may include a housing 102 for housing and physically coupling the components of the pulsed beam optical assembly 101 and the infrared beam optical assembly 201, 201' may include a housing 202, 202' for housing and physically coupling the components of the infrared beam optical assembly 201, 201'.

The optical system 100 may further comprise a mounting unit 182 and both the housing 102 of the pulsed beam optical assembly 101 and the housing 202, 202' of the infrared beam optical assembly 201 may be coupled to the mounting unit 182, for example, movably coupled to the mounting unit 182 to facilitate translational motion of the pulsed laser beam 112 generated by the pulsed laser beam source 110 of the pulsed beam optical assembly 101 and translational motion of the infrared laser beam 212 generated by the infrared laser beam source 210. Further, the optical system 100 comprises a translatable stage 180. As depicted in FIGS. 2A and 2B, the transparent workpiece 160 may be mounted on the translatable stage 180, which facilitates translation motion of the transparent workpiece 160. Thus, relative motion between transparent workpiece 160 and each of the pulsed laser beam 112 and the infrared laser beam 212 (e.g., synchronous relative motion) may be generated by movement of the translatable stage 180, movement of the housing 102 of the pulsed beam optical assembly 101 and the housing 202, 202' of the infrared beam optical assembly 201, 201' along the mounting unit 182, movement of the mounting unit 182 itself, or combinations thereof.

Referring now to FIG. 2A, the infrared beam optical assembly 201 comprises the infrared laser beam source 210, an aspheric optical element 220, a first plano-convex lens 222, a second plano-convex lens 224, a beam conditioning element 226, and a beam directing element 230. While not intending to be limited by theory, the infrared laser beam 212 may comprise a Gaussian beam having diameter of from about 8 mm to about 10 mm (according to its $1/e^2$ diameter), and the aspheric optical element 220 may comprise an axicon lens, which may comprise a conical surface having an angle of about 1.2°, such as from about 0.5° to about 5°, or from about 1° to about 1.5°, or even from about 0.5° to about 5° (the angle measured relative to the flat surface upon which the infrared laser beam 212 enters the aspheric optical element 220. The aspheric optical element 220 (e.g., the axicon lens) shapes the incoming infrared laser beam 212 (which comprises a Gaussian beam) into a Bessel beam. In some embodiments, the aspheric optical element 220 may comprise a refractive axicon, a reflective axicon, waxicon, negative axicon, a spatial light modulator, a diffractive optic, a cubically shaped optical element, or any optical element for shaping a Gaussian beam into a Bessel beam.

Referring still to FIG. 2A, the first plano-convex lens 222 and the second plano-convex lens 224 are positioned downstream from the aspheric optical element 220 such that the infrared laser beam 212 output by the infrared laser beam source 210 is directed through the aspheric optical element 220 and, thereafter, through the first plano-convex lens 222 and the second plano-convex lens 224. As used herein "upstream" and "downstream" refer to the relative position of two locations or components of an optical assembly (e.g., the pulsed beam optical assembly 101 or the infrared beam optical assembly 201) with respect to a beam source (e.g., the pulsed laser beam source 110 or the infrared laser beam source 210). For example, a first component is upstream from a second component if the beam output by the beam source traverses the first component before traversing the second component. Further, a first component is downstream from a second component if the beam output by the beam source traverses the second component before traversing the first component.

In operation, the first plano-convex lens 222 and the second plano-convex lens 224 collimate the Bessel beam (e.g., the infrared laser beam 212 after the infrared laser beam traverses the aspheric optical element 220) and adjust the diameter(s) of the infrared laser beam 212 (e.g., adjust the inner diameter 216 and the outer diameter 218 of the infrared beam spot 214 formed on the imaging surface 162 of the transparent workpiece 160). In some embodiments, the first plano-convex lens 222 may have a focal length of from about 50 mm to about 200 mm (such as from about 50 mm to about 150 mm, or from about 75 mm to about 100 mm), and the second plano-convex lens 224 may have a focal length less than that of the first plano-convex lens 222, such as from about 25 mm to about 50 mm.

The beam directing element 230 may comprise a mirror or other reflective component, a rotatable scanner, such as a galvanometer scanning mirror, a 2D scanner, or the like, or any other known or yet-to-be-developed optical component for redirecting a laser beam. In the embodiment of the infrared beam optical assembly 201 depicted in FIG. 2A, the beam directing element 230 is positioned downstream the aspheric optical element 220, the first plano-convex lens 222, and the second plano-convex lens 224 such that the infrared laser beam 212 is redirected by the beam directing element 230 while converging from the second plano-convex lens 224. However, in other embodiments, the beam directing element 230 may be positioned upstream one or more of the aspheric optical element 220, the first plano-convex lens 222, and the second plano-convex lens 224.

As depicted in FIG. 2A, the beam directing element 230 is optically coupled to the infrared laser beam source 210 such that the beam directing element 230 redirects (e.g., reflects) the incoming infrared laser beam 212. Thus, the portion of the infrared laser beam 212 downstream the beam directing element 230 propagates from the beam directing element 230 to the transparent workpiece 160 in a direction 14, such that the infrared laser beam 212 irradiates the transparent workpiece at an approach angle θ, which is the angular difference between the beam propagation direction of the pulsed laser beam 112 (i.e. direction 12) and the beam propagation direction of the infrared laser beam 212 downstream the beam directing element 230 (i.e. direction 14). In some embodiments, the approach angle θ may be from about 30° to about 75°, from about 40° to about 65°, or the like, such as about 30°, 35°, 40°, 45°, 50°, 55°, 60°, 65°, 70°, 75°, or the like. Further, the approach angle θ is non-parallel to the beam propagation direction of the pulsed laser beam 112 (i.e. direction 12). Thus, the components of the infrared beam optical assembly 201 and the pulsed beam optical assembly 101 may be positioned apart from one another and the infrared laser beam 212 and the pulsed laser beam 112 do not need to be coaxial for the infrared beam spot 214 formed on the imaging surface 162 of the transparent workpiece 160 to circumscribe the pulsed laser beam spot 114 formed on the imaging surface 162 of the transparent workpiece 160 (FIG. 1A).

Moreover, in embodiments in which the pulsed laser beam spot 114 is offset from the infrared beam spot 214 at the imaging surface 162 of the transparent workpiece 160 (FIG. 1B), it may still be advantageous to redirect the infrared laser beam 212 such that the portion of the infrared laser beam 212 downstream beam directing element 230 propagates from the beam directing element 230 to the transparent workpiece 160 in the direction 14 at the approach angle θ as the spacing distance 15 (FIG. 1B) may be too small to for the infrared beam optical assembly 201 and the pulsed beam optical assembly 101 form two parallel beams offset by the spacing distance 15. In other embodiments, the infrared beam optical assembly 201 may further comprise another beam directing element positioned downstream the beam directing element 230 to reorient the infrared laser beam 212 parallel the pulsed laser beam 112 (e.g., direct the pulsed laser beam into the direction 12) such that the infrared laser beam 212 irradiates the imaging surface 162 of the transparent workpiece 160 parallel and offset from the pulsed laser beam spot 114 by the spacing distance 15.

Further, the beam conditioning element 226 is configured to alter the cross-sectional beam profile of the infrared laser beam 212, for example, to account for the alteration of the shape of the infrared beam spot 214 caused by irradiating the imaging surface 162 of the transparent workpiece 160 at the approach angle θ. In particular, the beam conditioning element 226 is configured to alter the cross-sectional beam profile of the pulsed laser beam 112 such that the infrared beam spot 214 projected onto the imaging surface 162 of the transparent workpiece 160 comprises a desired shape (e.g., circular, elliptical, or the like). For example, if the portion of the infrared laser beam 212 comprises a circular cross-sectional beam profile after redirection by the beam directing element 230 and thereafter irradiates the imaging surface 162 of the transparent workpiece 160 at the approach angle θ (without traversal through the beam conditioning element 226), the resultant shape of the infrared beam spot 214 will not be circular. However, the beam conditioning element 226 may alter the cross-sectional beam profile of the infrared laser beam 212 such that the resultant shape of the infrared beam spot 214 is circular. The beam conditioning element 226 may comprise a cylindrical lens, a prism, a diffractive optical element, a telescope lens, or the like. As depicted in FIG. 2A, the beam conditioning element 226 is positioned downstream the beam directing element 230 such that the beam conditioning element 226 alters the cross-sectional beam profile of the infrared laser beam 212 after the beam directing element 230 redirects the infrared laser beam 212 into the direction 14. In other embodiments, the beam conditioning element 226 may be positioned upstream the beam directing element 230 such that the beam conditioning element 226 alters the cross-sectional beam profile of the infrared laser beam 212 before the beam directing element 230 redirects the infrared laser beam 212 into the direction 14.

Referring now to FIG. 2B, the infrared beam optical assembly 201' has a beam directing element 230' that comprises a 2D scanning system. In some embodiments, the 2D scanning system 230' may house the optical components of the infrared beam optical assembly 201' such that the housing of the 2D scanning system 230' is the housing 202' of the infrared beam optical assembly 201'. In operation, the infrared laser beam 212 may be output by the 2D scanning system 230' and thereby directed onto the transparent workpiece 160. In some embodiments the 2D scanning system 230' is coupled to the mounting unit 182. For example, the 2D scanning system 230' may be rotatably coupled to the mounting unit 182 such that the 2D scanning system 230' is rotatable about an axis of rotation 205. In some embodiments, the 2D scanning system 230' is also translatable relative to the transparent workpiece 160 along the Z direction. Thus, when the direction of the direction 14 of the infrared laser beam 212 is altered (thereby altering the approach angle θ) and the position of the 2D scanning system 230' along to Z direction may also be altered such that the infrared laser beam 212 may irradiate the transparent workpiece 160 at a desired location. Further, while not depicted, the infrared beam optical assembly 201' further comprises the infrared laser beam source (which may be a component of the 2D scanning system 230' and thereby housed within the housing 202'). Further, the 2D scanning system 230' may be configured to output a Gaussian infrared beam or a Bessel infrared beam. In embodiments in which the 2D scanning system 230' outputs a Gaussian beam, the infrared beam optical assembly 201' may further comprise an aspheric optical element housed within the 2D scanning system 230' or positioned downstream the 2D scanning system 230' to shape the Gaussian beam into a Bessel beam. Moreover, in some embodiments, the infrared beam optical assembly 201' may further comprise one or more lens (such as first and second plano-convex lens) and a beam conditioning element, as described above with respect to FIG. 2A.

Referring again to FIGS. 2A and 2B, the pulsed beam optical assembly 101 for producing the pulsed laser beam 112 and forming the pulsed laser beam 112 into the pulsed laser beam focal line 113 comprises the pulsed laser beam source 110 and an aspheric optical element 120. The aspheric optical element 120 may comprise an axicon, such as refractive axicon, a reflective axicon, or negative axicon, a waxicon, a spatial light modulator, a diffractive optic, or a cubically shaped optical element. The pulsed laser beam 112 output by the pulsed laser beam source 110 may comprise a Gaussian beam, which is converted into a Gauss-Bessel beam by the aspheric optical element 120. Without intending to be limited by theory, a Gauss-Bessel beam diffracts much more slowly than a Gaussian beam (e.g., the Gauss-Bessel beam may maintain single micron diameter spot sizes for ranges of hundreds of microns or millimeters as opposed to a few tens of microns or less). In other words, the aspheric optical element 120 condenses the pulsed laser beam 112 a high intensity region of cylindrical shape and high aspect ratio (long length and small diameter). Due to the high intensity created with the condensed laser beam, while the pulsed laser beam 112 is directed into the transparent workpiece 160 (e.g., when the pulsed laser beam focal line 113 is directed into the transparent workpiece 160) nonlinear interaction of the electromagnetic field of the laser and the workpiece material may occur and the laser energy may be transferred to the transparent workpiece to effect formation of defects that become constituents of the contour line. However, it is important to realize that in the areas of the material where the laser energy intensity is not high (e.g., the glass volume of workpiece surrounding the central convergence line), the material of the transparent workpiece is largely unaffected by the laser and there is no mechanism for transferring energy from the laser to the material. As a result, nothing happens to the workpiece directly at the focal zone when the laser intensity is below the nonlinear threshold.

While the aspheric optical element 120 may convert the pulsed laser beam into a Gauss-Bessel beam and focus the pulsed laser beam 112 into a pulsed laser beam focal line 113, in some embodiments, the pulsed beam optical assembly 101 may further comprise additional optical components to help form the pulsed laser beam 112 into the pulsed laser beam focal line 113. For example, the pulsed beam optical assembly 101 depicted in FIGS. 2A and 2B comprises a first lens 130 and a second lens 132, each positioned downstream the aspheric optical element 120 to collimate and thereafter focus the pulsed laser beam 112 into the pulsed laser beam focal line 113. Other optical components are described in embodiments of the pulsed beam optical assembly 101 depicted in FIGS. 4 and 5A, described below.

Further, the transparent workpiece 160 is positioned such that the pulsed laser beam 112 output by the pulsed laser beam source 110 irradiates the transparent workpiece 160. In operation, the pulsed beam optical assembly 101 may form the pulsed laser beam 112 into a pulsed laser beam focal line 113, which may be directed into the transparent workpiece 160 to induce absorption within the transparent workpiece 160, for example, along the separation path 165, to form an individual defect 172. Moreover, translating the pulsed laser beam focal line 113 and the transparent workpiece 160 relative to one another may form the contour line 170 comprising the plurality of defects 172.

In operation, the pulsed laser beam 112 (e.g., the pulsed laser beam focal line 113) may create multi-photon absorption (MPA) in substantially transparent materials such as the transparent workpiece 160 to form the defects 172 of the contour line 170. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

Figure 3:
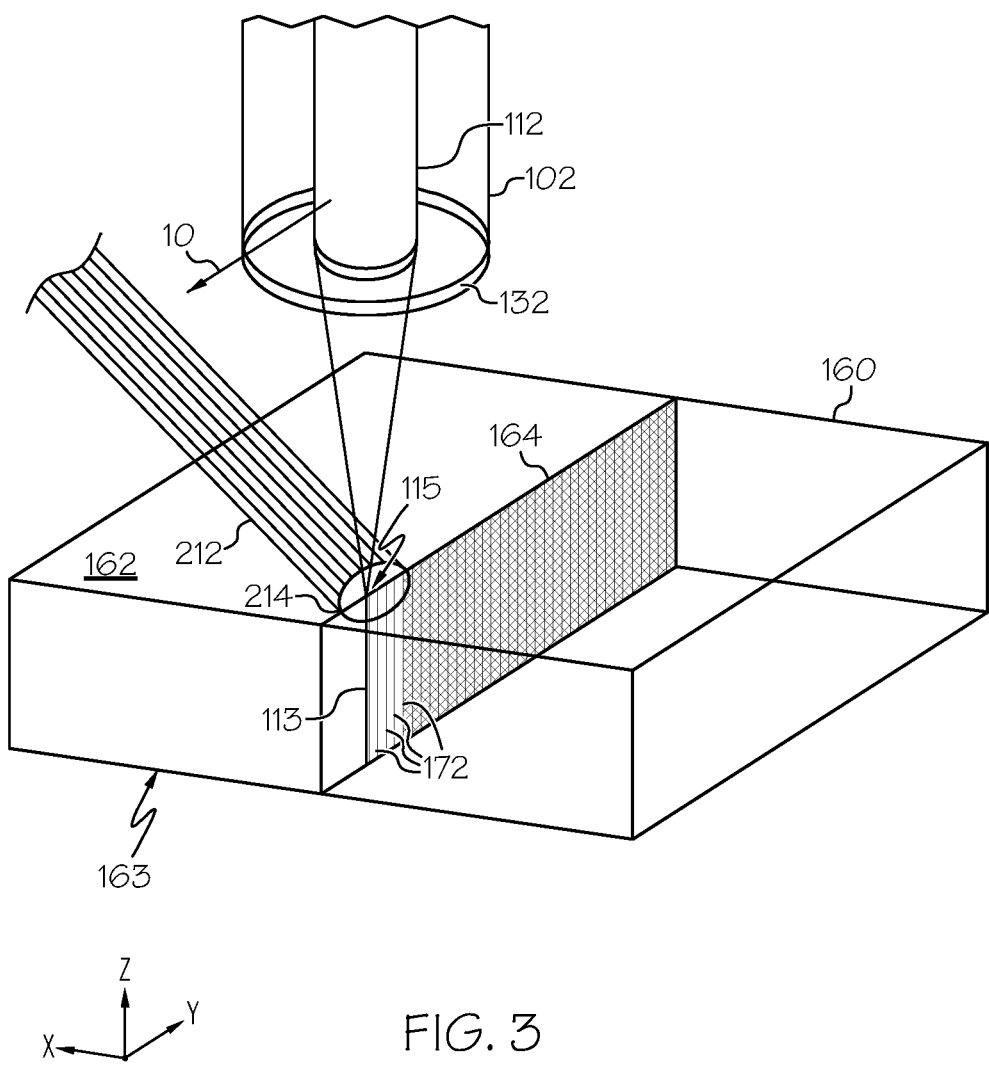
FIG. 3 schematically depicts the formation and separation of a contour line of defects in the transparent workpiece of FIGS. 2A and 2B, according to one or more embodiments described herein.

Referring now to FIG. 3, the transparent workpiece 160 undergoing laser processing by the pulsed laser beam 112 and the infrared laser beam 212 to synchronously form the contour line 170 and separate the transparent workpiece 160 along the contour line 170 is depicted in more detail. While not intending to be being bound by theory, it is believed that the high aspect ratio of the defects 172 created by the ultra-short pulsed laser (e.g. the pulsed laser beam focal line 113 of the pulsed laser beam 112) facilitates extension of the defects 172 from the top to the bottom surfaces of the transparent workpiece 160 (i.e. from imaging surface 162 to the second surface 163). In principle, this defect may be created by a single pulse and if necessary, additional pulses may be used to increase the extension of the affected area (depth and width). In embodiments, the pulsed laser beam focal line 113 may have a length in a range of from about 0.1 mm to about 10 mm, or from about 0.5 mm to about 5 mm, for example, about 1 mm, about 2 mm, about 3 mm, about 4 mm, about 5 mm, about 6 mm, about 7 mm, about 8 mm, or about 9 mm, or a length in a range of from about 0.1 mm to about 2 mm, or from 0.1 mm to about 1 mm. In embodiments, the pulsed laser beam focal line may have an average spot diameter in a range of from about 0.1 micron to about 5 microns. The defects 172 each may have a diameter of from about 0.1 microns to 30 microns, for example, from about 0.25 microns to about 5 microns (e.g., from about 0.25 microns to about 0.75 microns).

While contour lines may be linear, like the contour line 170 illustrated in FIGS. 1A, 1B, and 3, the contours lines may also be nonlinear (i.e., having a curvature). Curved contour lines may be produced, for example, by translating either the transparent workpiece 160 or pulsed laser beam 112 with respect to the other in two dimensions instead of one dimension. Further, in embodiments in which the contour line 170 comprises a curvature and the infrared laser beam 212 forms an infrared beam spot 214 comprising an elliptical or oval shape, it may be advantageous for the beam directing element 230, 230' (FIGS. 2A and 2B) to comprise a rotatable scanner configured to rotate the infrared laser beam 212 and thereby rotate the infrared beam spot 214. In particular, when the infrared beam spot 214 comprises an ellipse or an oval, the infrared beam spot 214 may be oriented such that the major axis (e.g., the longest diameter of the infrared beam spot 214) extends along the contour line 170. Thus, when the contour line 170 has a curvature, the rotatable scanner may rotate the infrared laser beam 212 such that the infrared beam spot 214 rotates when translating along the imaging surface 162 of the transparent workpiece 160 and in some embodiments, the major axis of the infrared beam spot 214 remains oriented along the contour line 170 when the infrared laser beam 212 is translated relative to the transparent workpiece 160 along the curved contour line 170.

Further, in some embodiments, the distance, or periodicity, between adjacent defects 172 along the direction of the contour line 170 may be at least about 0.1 micron or 1 micron and less than or equal to about 20 microns or even 30 microns. For example, in some transparent workpieces, the periodicity between adjacent defects 172 may be from about 0.5 to about 15 microns, or from about 3 microns to about 10 microns, or from about 0.5 microns to about 3.0 microns. For example, in some transparent workpieces the periodicity between adjacent defects 172 may be from about 0.5 micron to about 1.0 micron. However for alkaline earth boro-aluminosilicate glass compositions, especially those 0.5 mm thick or of greater thickness, the periodicity between adjacent defects 172 may be at least about 1 microns, such as at least about 5 microns, or from about 1 microns to about 15 microns.

Figure 4:
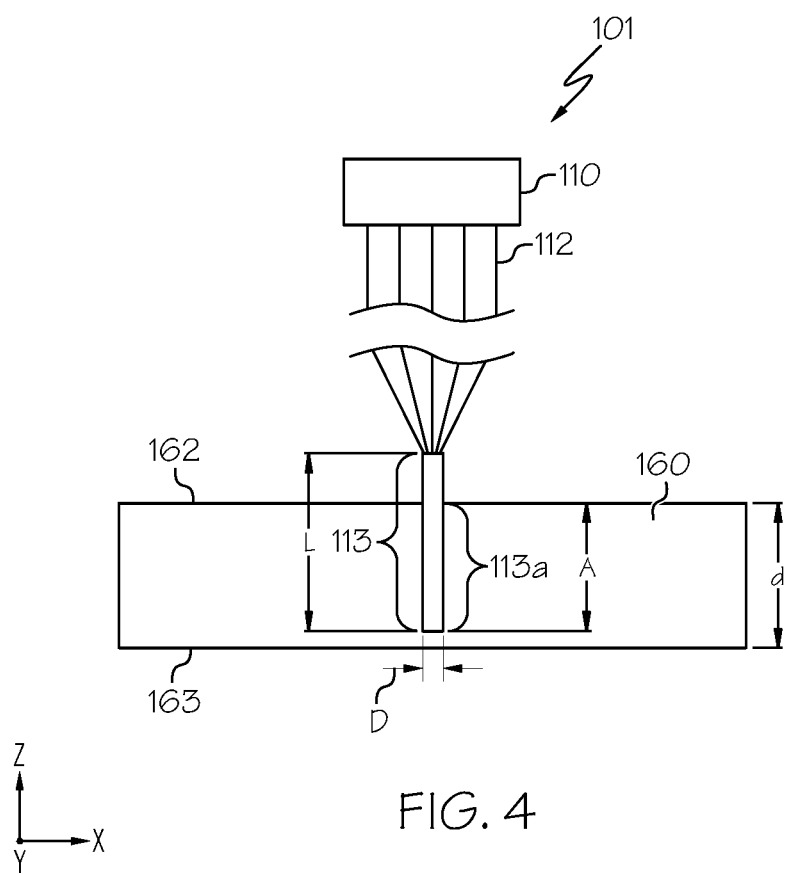
FIG. 4 schematically depicts an example positioning of a pulsed laser beam focal line during processing of a transparent workpiece, according to one or more embodiments described herein.

Referring now to FIG. 4, formation of the contour line 170 using the pulsed beam optical assembly 101 may include focusing the pulsed laser beam 112 into the pulsed laser beam focal line 113 comprising a length L. The transparent workpiece 160 is positioned to at least partially overlap the pulsed laser beam focal line 113 of pulsed laser beam 112. The pulsed laser beam focal line 113 is thus directed into the transparent workpiece 160 having a depth d. Further, as depicted in FIG. 4, the impingement location 115 of the transparent workpiece 160 is aligned orthogonal to the pulsed laser beam focal line 113. The transparent workpiece 160 may be positioned relative to the pulsed laser beam focal line 113 such that the pulsed laser beam focal line 113 starts before or at the imaging surface 162 of the transparent workpiece 160 and stops before a second surface 163 of the transparent workpiece 160 (i.e., the pulsed laser beam focal line 113 terminates within the transparent workpiece 160 and does not extend beyond the second surface 163).

Moreover, it is desirable to position the pulsed laser beam focal line 113 relative to the transparent workpiece 160 such that the pulsed laser beam focal line 113 extends into the transparent workpiece 160 orthogonal to the imaging surface 162 of the transparent workpiece 160 at the impingement location 115 of the transparent workpiece 160. If the pulsed laser beam focal line 113 is not orthogonal the transparent workpiece 160, the pulsed laser beam focal line 113 shifts and spreads along the depth of the transparent workpiece 160, causing the pulsed laser beam focal line 113 to distribute energy over a larger volume of the transparent workpiece 160, lowering the sharpness and focus of the pulsed laser beam focal line 113 and generating lower quality, less uniform defects 172 within the transparent workpiece 160.

Referring still to FIG. 4, in the overlapping area of the pulsed laser beam focal line 113 with the transparent workpiece 160 (i.e., in the transparent workpiece material covered by the pulsed laser beam focal line 113), the pulsed laser beam focal line 113 generates (assuming suitable laser intensity along the pulsed laser beam focal line 113, which intensity is ensured by the focusing of pulsed laser beam 112 on a section of length L, i.e. a line focus of length L) a section 113a (aligned along the longitudinal beam direction) along which an induced absorption is generated in the material of the transparent workpiece 160. The induced absorption produces the defect 172 in the transparent workpiece 160 along section 113a. Formation of the defect 172 is not only local, but over the entire length of the section 113a of the induced absorption. The length of section 113a (which corresponds to the length of the overlapping of the pulsed laser beam focal line 113 with the transparent workpiece 160) is labeled with reference A. The internal diameter of the defect area (i.e., the defect 172) at the section 113a of the induced absorption is labeled with reference D. This internal diameter D corresponds to the average diameter of the pulsed laser beam focal line 113, that is, an average spot diameter in a range of between about 0.1 µm and about 5 µm.

Figure 5A:
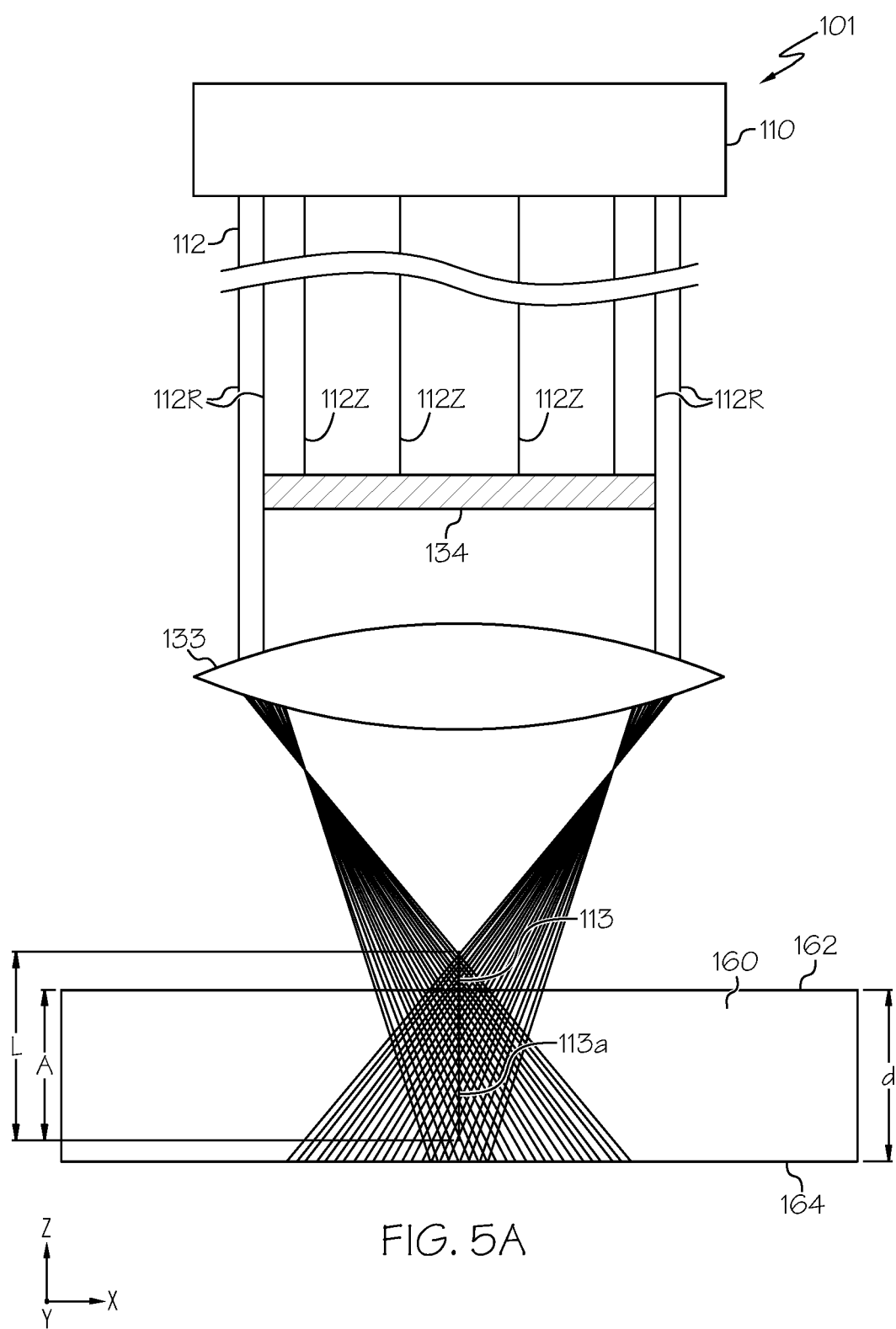
FIG. 5A schematically depicts an optical assembly for pulsed beam laser processing, according to one or more embodiments described herein.

Referring now to FIG. 5A, an example of the pulsed beam optical assembly 101 comprises an aspheric optical element (not pictured), a lens 133 and an aperture 134 (e.g., a circular aperture). As depicted in FIG. 5A, the pulsed laser beam 112 emitted by the pulsed laser beam source 110 is directed onto the aperture 134 which is opaque to the wavelength of laser radiation of the pulsed laser beam 112. Aperture 134 is oriented perpendicular to the longitudinal beam axis and is centered on the central portion of the pulsed laser beam 112. The diameter of the aperture 134 is selected in such a way that the laser radiation near the center of the pulsed laser beam 112 (i.e., the central beam portion, here labeled with 112Z) hit the aperture 134 and is completely absorbed by it. Only the beams in the outer perimeter range of the pulsed laser beam 112 (i.e., marginal rays, here labeled with 112R) are not absorbed by the circular aperture 134 due to the reduced aperture size compared to the beam diameter, and pass aperture 134 laterally and hit the marginal areas of the lens 133 which, in this embodiment, is designed as a spherically cut, bi-convex lens.

As illustrated in FIG. 5A, the pulsed laser beam focal line 113 may not only be a single focal point for the pulsed laser beam 112, but rather a series of focal points for different rays in the pulsed laser beam 112. The series of focal points form an elongated pulsed laser beam focal line 113 of a defined length, shown in FIG. 5A as the length L of the pulsed laser beam focal line 113. Lens 133 may be centered on the central beam and may be designed as a non-corrected, bi-convex focusing lens in the form of a common, spherically cut lens. As an alternative, aspheres or multi-lens systems deviating from ideally corrected systems, which do not form an ideal focal point but a distinct, elongated pulsed laser beam focal line 113 of a defined length, may also be used (i.e., lenses or systems which do not have a single focal point). The zones of the lens 133 thus focus along the pulsed laser beam focal line 113, subject to the distance from the lens center. The diameter of aperture 134 across the beam direction may be approximately 90% of the diameter of the pulsed laser beam 112 (defined by the distance required for the intensity of the beam to decrease to $1/e^2$ of the peak intensity) and approximately 75% of the diameter of the lens 133. The pulsed laser beam focal line 113 of a non-aberration-corrected spherical lens 133 generated by blocking out the beam bundles in the center is thus used. FIG. 5A shows a section in one plane through the central beam, and the complete three-dimensional bundle may be seen when the depicted beams are rotated around the pulsed laser beam focal line 113.

Figures 1, 5B:
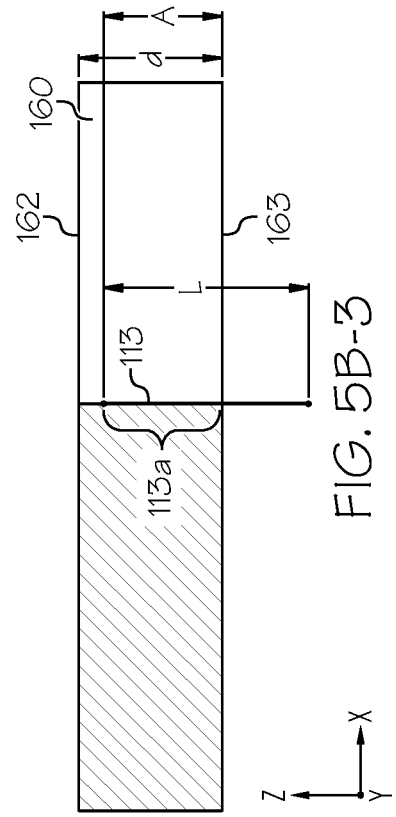
FIG. 5B-1 schematically depicts a first embodiment of a pulsed beam laser focal line in relationship to a transparent workpiece, according to one or more embodiments described herein.

FIG. 5B-1 through FIG. 5B-4 show that the position of the pulsed laser beam focal line 113 may be controlled by suitably positioning and/or aligning components of the pulsed beam optical assembly 101 relative to the transparent workpiece 160 as well as by suitably selecting the parameters of the pulsed beam optical assembly 101. Further, the length L of the pulsed laser beam focal line 113 is schematically depicted in FIG. 5B-1 through FIG. 5B-4 for illustrative purposed. In operation, the length L of the pulsed laser beam focal line 113 depends on the position of the pulsed laser beam focal line 113 within the transparent workpiece 160 and the index of refraction of the transparent workpiece 160. As FIG. 5B-1 illustrates, the length L of the pulsed laser beam focal line 113 may be adjusted in such a way that it exceeds the depth d of the transparent workpiece 160 (here by factor 2). If the transparent workpiece 160 is placed (viewed in longitudinal beam direction) centrally to the pulsed laser beam focal line 113, the extensive section of induced absorption (e.g., section 113a of length A) may be generated over the entire workpiece depth d. The pulsed laser beam focal line 113 may have a length L in a range of from about 0.01 mm to about 100 mm or in a range of from about 0.1 mm to about 10 mm. Various embodiments may be configured to have a pulsed laser beam focal line 113 with a length L in air of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. In some embodiments, the length L of the pulsed laser beam focal line 113 may be tuned, using the pulsed beam optical assembly 101, to correspond with the depth d of the transparent workpiece 160, for example, the pulsed laser beam focal line 113 may be tuned, using the pulsed beam optical assembly 101, such that the length L of the pulsed laser beam focal line 113 is between about 1.1 to about 1.8 times larger than the depth d of the transparent workpiece 160, for example 1.25, 1.5, or the like. As one example, in embodiments in which the transparent workpiece 160 comprises a depth of about 0.7 mm, the pulsed laser beam focal line 113 may comprise a length of about 0.9 mm. Further, in other embodiments, the pulsed laser beam focal line 113 may be tuned, using the pulsed beam optical assembly 101, such that the length L of the pulsed laser beam focal line 113 is substantially equal the depth d of the transparent workpiece 160.

Figures 2, 5B:
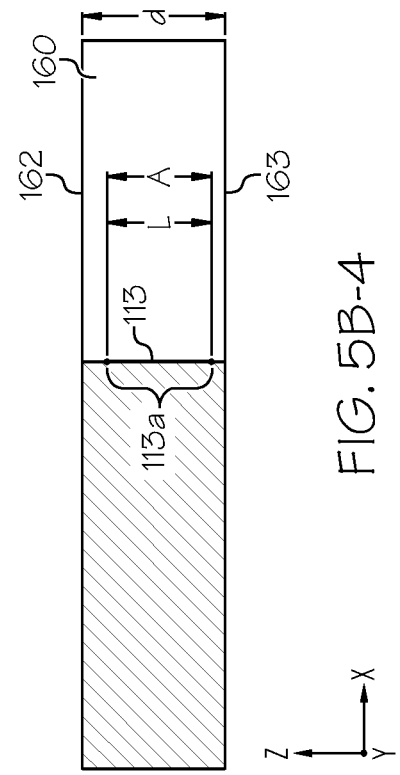
Figures 3, 5B:
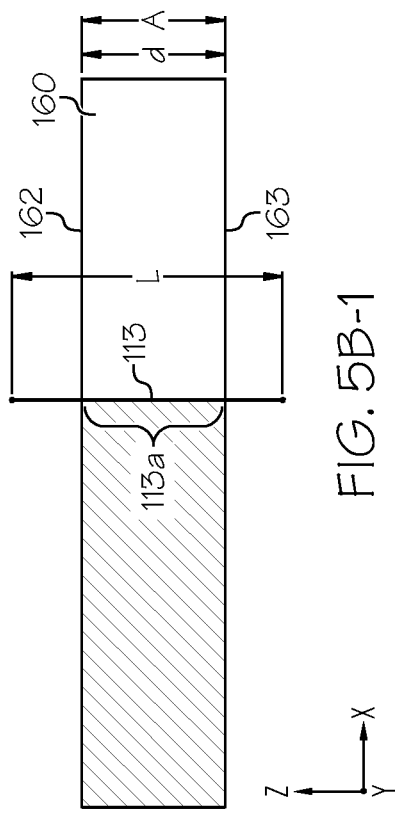
Figures 4, 5B:
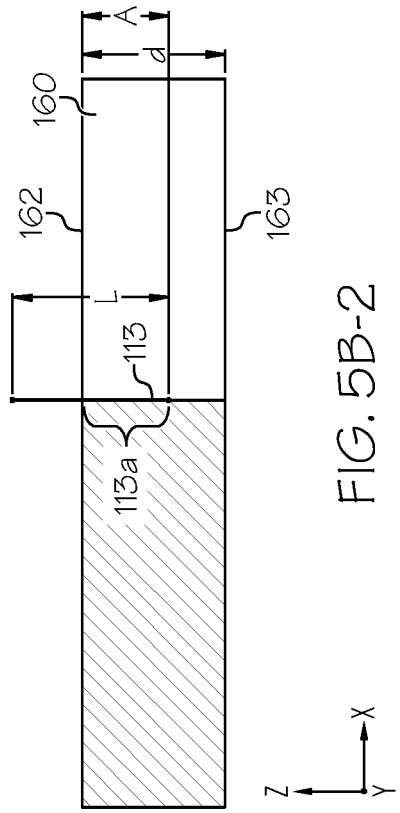

In the case shown in FIG. 5B-2, a pulsed laser beam focal line 113 of length L is generated which generally corresponds to the workpiece depth d. Since the transparent workpiece 160 is positioned relative to the pulsed laser beam focal line 113 in such a way that the pulsed laser beam focal line 113 starts at a point outside the transparent workpiece 160, the length A of the extensive section of induced absorption 113a (which extends from the imaging surface 162 to a defined workpiece depth, but not to the second surface 163 is smaller than the length L of the pulsed laser beam focal line 113. FIG. 5B-3 shows the case in which the transparent workpiece 160 (viewed along a direction perpendicular to the beam direction) is positioned above the starting point of the pulsed laser beam focal line 113 so that, as in FIG. 5B-2, the length L of pulsed laser beam focal line 113 is greater than the length A of the section of induced absorption 113a in the transparent workpiece 160. The pulsed laser beam focal line 113 thus starts within the transparent workpiece 160 and extends beyond the second surface 163. FIG. 5B-4 shows the case in which the focal line length L is smaller than the workpiece depth d so that, in the case of a central positioning of the transparent workpiece 160 relative to the pulsed laser beam focal line 113 viewed in the direction of incidence, the pulsed laser beam focal line 113 starts near the imaging surface 162 within the transparent workpiece 160 and ends near the second surface 163 within the transparent workpiece 160 (e.g., L=0.75 d).

Referring again to FIGS. 2A-5A, the pulsed laser beam source 110 may comprise any known or yet to be developed pulsed laser beam source 110 configured to output pulsed laser beams 112. As described above, the defects 172 of the contour line 170 are produced by interaction of the transparent workpiece 160 with the pulsed laser beam 112 output by the pulsed laser beam source 110. In some embodiments, the pulsed laser beam source 110 may output a pulsed laser beam 112 comprising a wavelength of for example, 1064 nm, 1030 nm, 532 nm, 530 nm, 355 nm, 343 nm, or 266 nm, or 215 nm. Further, the pulsed laser beam 112 used to form defects 172 in the transparent workpiece 160 may be well suited for materials that are transparent to the selected pulsed laser wavelength.

Suitable laser wavelengths for forming defects 172 are wavelengths at which the combined losses of absorption and scattering by the transparent workpiece 160 are sufficiently low. In embodiments, the combined losses due to absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the direction of propagation of the pulsed laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined absorption and scattering loss requirement for a given substrate material can also be used.

Further, the pulsed laser beam source 110 may output the pulsed laser beam 112 having a pulse energy of from about 25 μJ to about 1500 μJ, for example 100 μJ, 200 μJ, 250 μJ, 300 μJ, 400 μJ, 500 μJ, 600 μJ, 700 μJ, 750 μJ, 800 μJ, 900 μJ, 1000 μJ, 1100 μJ, 1200 μJ, 1250 μJ, 1300 μJ, 1400 μJ or the like. The pulsed laser beam source 110 may also be adjustable such that the pulsed laser beam source 110 may output pulsed laser beams 112 comprising various pulse energies. In operation, when the pulsed laser beam 112 is focused into the pulsed laser beam focal line 113, the pulsed laser beam focal line 113 may also comprise a pulse energy of from about 25 uJ to about 1500 uJ. In some embodiments, the pulse duration of the individual pulses of the pulsed laser beam 112 is in a range of from about 1 picosecond to about 100 picoseconds, such as from about 5 picoseconds to about 20 picoseconds, and the repetition rate of the individual pulses may be in a range from about 1 kHz to 4 MHz, such as in a range from about 10 kHz to about 3 MHz, or from about 10 kHz to about 650 kHz.

Now referring to FIGS. 6A and 6B, it should be understood that the typical operation of such the pulsed laser beam 112 described herein (e.g., a picosecond laser) creates a burst 500 of pulses 500A. Each burst 500 contains multiple individual pulses 500A (such as at least two pulses, at least 5 pulses, at least 7 pulses, at least 8 pulses, at least 9 pulses, at least 10 pulses, at least 15 pulses, at least 20 pulses, or even more pulses) of very short duration. That is, a burst is a group of pulses, and the bursts are separated from one another by a longer duration than the separation of individual adjacent pulses within each burst. According to one or more embodiments, for cutting or perforating display glass/TFT glass compositions, the number of pulses per burst may be from about 1 to 30 (such as from 5 to 20). Pulses 500A have pulse duration $T_d$ of up to 100 psec (for example, 0.1 psec, 5 psec, 10 psec, 15 psec, 18 psec, 20 psec, 22 psec, 25 psec, 30 psec, 40 psec, 50 psec, 75 psec, or any range therebetween). The energy or intensity of each individual pulse 500A within the burst may not be equal to that of other pulses within the burst, and the intensity distribution of the multiple pulses within a burst 500 often follows an exponential decay in time governed by the laser design. The use of the pulsed laser beam 112 capable of generating such bursts is advantageous for cutting or modifying transparent materials, for example glass. In contrast with the use of single pulses spaced apart in time by the repetition rate of the single-pulsed laser, the use of a burst sequence that spreads the laser energy over a rapid sequence of pulses within the burst allows access to larger timescales of high intensity interaction with the material than is possible with single-pulse lasers.

In some embodiments, each pulse 500A within the burst 500 of the exemplary embodiments described herein is separated in time from the subsequent pulse in the burst by a duration $T_p$ of from about 1 nsec to about 50 nsec (e.g., from about 10 nsec to about 50 nsec, or from about 10 nsec to about 30 nsec, with the time often governed by the laser cavity design). For a given laser, the time separation $T_p$ between adjacent pulses within a burst 500 may be relatively uniform (e.g., within about 10% of one another). For example, in some embodiments, each pulse within a burst is separated in time from the subsequent pulse by approximately 20 nsec (50 MHz). For example, for a pulsed laser beam source 110 that produces pulse separation $T_p$ of about 20 nsec, the pulse to pulse separation $T_p$ within a burst is maintained within about ±10%, or about ±2 nsec. The time between each burst of pulses (i.e., the time separation $T_b$ between bursts) will be much longer. For example, the time between each burst of pulses may be from about 0.25 microseconds to about 1000 microseconds, e.g., from about 1 microsecond to about 10 microseconds, or from about 3 microseconds to about 8 microseconds.

In some of the exemplary embodiments of the pulsed laser beam source 110 described herein, the time separation $T_b$ is about 5 microseconds for a laser with a burst repetition rate of about 200 kHz. The laser burst repetition rate is related to the time $T_b$ between the first pulse in a burst to the first pulse in the subsequent burst (laser burst repetition rate=1/$T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and preferably $T_d$≤15 psec) of high intensity have been shown to work particularly well.

The energy required to modify the material of the transparent workpiece may be described in terms of the burst energy (i.e., the energy contained within a burst where each burst 500 contains a series of pulses 500A), or in terms of the energy contained within a single laser pulse (many of which may comprise a burst). The energy per burst may be from about 25 µJ to about 750 µJ, e.g., from about 50 µJ to about 500 µJ, or from about 50 µJ to about 250 µJ. For some glass compositions, the energy per burst may be from about 100 µJ to about 250 µJ. However, for display or TFT glass compositions, the energy per burst may be higher (e.g., from about 300 µJ to about 500 µJ, or from about 400 µJ to about 600 µJ, depending on the specific display/TFT glass composition of the workpiece). The energy of an individual pulse within the burst will be less, and the exact individual laser pulse energy will depend on the number of pulses 500A within the burst 500 and the rate of decay (e.g., exponential decay rate) of the laser pulses with time as shown in FIGS. 6A and 6B. For example, for a constant energy/burst, if a pulse burst contains 10 individual laser pulses 500A, then each individual laser pulse 500A will contain less energy than if the same burst 500 had only 2 individual laser pulses.

While not intending to be limited by theory, the use of a pulsed laser beam source (such as the pulsed laser beam source 110) capable of generating such bursts is advantageous for cutting or modifying transparent materials, for example glass. In contrast with the use of single pulses spaced apart in time by the repetition rate of the single-pulsed laser, the use of a burst sequence that spreads the laser energy over a rapid sequence of pulses within the burst 500 allows access to larger timescales of high intensity interaction with the material than is possible with single-pulse lasers. While a single-pulse may be expanded in time, the intensity within the pulse is reduced as roughly one over the pulse width. Therefore, if a 10 psec single pulse is expanded to a 10 nsec pulse, the intensity is reduced by roughly three orders of magnitude.

Such a reduction may reduce the optical intensity to the point where non-linear absorption is no longer significant, and light-material interaction is no longer sufficient for cutting. In contrast, with a pulse burst laser, the intensity during each pulse 500A within the burst 500 may remain relevantly high (for example, three 10 psec pulses 500A spaced apart in time by approximately 10 nsec still allows the energy within each pulse burst to be approximately three times higher than that of a single 10 psec pulse) and the laser interacts with the material over a timescale that is three orders of magnitude larger. For example, often 10 psec pulses 500A spaced apart in time by approximately 10 nsec results in the energy within each pulse burst to be approximately ten times higher than that of a single 10 psec pulse and the laser interacts with the material over a timescale that is now orders of magnitude larger. In one embodiment, the required amount of burst energy to modify the material will depend on the workpiece material composition and the length of the line focus used to interact with the workpiece.

While not intending to be limited by theory, the longer the interaction region, the more the energy is spread out, and higher burst energy will be required. The exact timing, pulse duration, and burst repetition rates may vary depending on the laser design, but short pulses times (e.g., less than about 15 psec, or even less than or equal to about 10 psec) of high intensity pulses may be exemplary in some embodiments. In operation, the defect 172 is formed in the material of the transparent workpiece 160 when a single burst of pulses strikes essentially the same location on the transparent workpiece 160. That is, multiple laser pulses within a single burst correspond to a single defect 172 in the transparent workpiece 160. Since the transparent workpiece 160 is translated (e.g., by the translatable stage 180 or the beam moved relative to the transparent workpiece 160), the individual pulses within the burst cannot be at exactly the same spatial location on the glass. However, the individual pulses may be within 1 µm of one another (i.e., they effectively strike the glass at essentially the same location). For example, the pulses may strike the glass at a spacing, sp, from one another where 0<sp≤500 nm. When, for example, a glass location is hit with a burst of 20 pulses the individual pulses within the burst strike the glass within 250 nm of each other. Thus, in some embodiments 1 nm<sp<250 nm. In some embodiments 1 nm<sp<100 nm.

In one or more embodiments, for the purposes of cutting or separating the workpiece, pulse burst energy may be from about 100 µJ to about 600 µJ per burst, such as from about 300 µJ to about 600 µJ per burst. For some display glass types the pulse burst energy may be from about 300 µJ to about 500 µJ, or for other display type glass from about 400 µJ to about 600 µJ. A pulse burst energy of 400 µJ to 500 µJ may work well for many display type glass compositions. Energy density within the line focus may be optimized for specific display or TFT glasses. For example, for both EAGLE XG and CONTEGO glasses, a suitable range for the pulse burst energy may be from about 300 to about 500 µJ and the line focus may be from about 1.0 mm to about 1.4 mm (where the line focus length is determined by the optical configuration).

In one or more embodiments, relatively low pulsed laser energy densities (e.g., below 300 µJ) may form perforations which do not form as desired, causing the fracture between defects to not readily materialize during infrared laser processing, leading to increased break resistance (also referred to herein as a break strength) in display glass. If the energy density of the pulsed laser beam is too high (e.g., greater than or equal to 600 µJ, or even greater than 500 µJ) the heat damage may be greater, causing the crack connecting the perforation to stray and not form along the desired path and the break resistance (break strength) of the display (or TFT) glass to dramatically increase.

In view of the foregoing description, it should be understood that the processing time for laser separation of transparent workpieces by infrared laser beam may be decreased by laser forming a plurality of defects in a transparent workpiece using a pulsed laser beam and heating these defects using an infrared laser beam in a single, synchronized step of relative motion between the transparent workpiece and both the infrared laser beam and the pulsed laser beam. The infrared laser beam may form an infrared beam spot on the transparent workpiece and the pulsed laser beam may be directed into the transparent workpiece such that the infrared beam spot surrounds (e.g., circumscribes) a pulsed laser beam spot form by the pulsed laser beam on an imaging surface of the transparent workpiece. Alternatively, the pulsed laser beam may be directed into the transparent workpiece such that the pulsed laser beam spot formed by the pulsed laser beam is spaced apart from the infrared beam spot by a spacing distance. In each of these embodiments, the defect line is formed by the pulsed laser beam and separated by the infrared laser beam and the transparent workpiece is separated along the defect line by synchronous relative motion between the transparent workpiece and both the pulsed laser beam and the infrared laser beam.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for laser processing a transparent workpiece, the method comprising:
    focusing a pulsed laser beam output by a pulsed laser beam source into a pulsed laser beam focal line oriented along a beam propagation direction and directed into the transparent workpiece, thereby forming a pulsed laser beam spot on an imaging surface of the transparent workpiece, wherein:
        the pulsed laser beam focal line generates an induced absorption within the transparent workpiece; and
        the induced absorption produces a defect along the pulsed laser beam focal line within the transparent workpiece;
    directing an infrared laser beam output by an infrared beam source onto the transparent workpiece such that the infrared laser beam forms an annular infrared beam spot on the imaging surface, wherein:
        the annular infrared beam spot circumscribes the pulsed laser beam spot at the imaging surface; and
        the infrared laser beam heats the transparent workpiece;
    translating the transparent workpiece and the pulsed laser beam focal line relative to each other along a separation path, thereby laser forming a plurality of defects that define a contour line within the transparent workpiece along the separation path; and
    translating the transparent workpiece and the annular infrared beam spot relative to each other along the separation path synchronous with the translation of the transparent workpiece and the pulsed laser beam focal line relative to each other, such that the annular infrared beam spot circumscribes the pulsed laser beam spot during relative motion of the transparent workpiece and the pulsed laser beam focal line and irradiates the transparent workpiece along or near the contour line to separate the transparent workpiece along the contour line.

2. The method of claim 1, wherein:
    the pulsed laser beam is directed through one or more lenses to form the pulsed laser beam focal line;
    at least one of the one or more lenses comprises an aspheric optical element; and
    the aspheric optical element comprises a refractive axicon, a reflective axicon, negative axicon, a spatial light modulator, a diffractive optic, or a cubically shaped optical element.

3. The method of claim 1, wherein:
    the infrared laser beam is directed through one or more lenses positioned between the infrared beam source and the transparent workpiece;
    at least one of the one or more lenses comprises an aspheric optical element; and
    the aspheric optical element comprises a refractive axicon, a reflective axicon, negative axicon, a spatial light modulator, a diffractive optic, or a cubically shaped optical element.

4. The method of claim 1, wherein the infrared laser beam is redirected by a beam directing element onto the transparent workpiece at an approach angle that is non-parallel to the beam propagation direction of the pulsed laser beam.

5. The method of claim 4, wherein the beam directing element comprises a mirror, a 2D scanner system, or a rotatable scanner.

6. The method of claim 5, wherein the beam directing element comprises the rotatable scanner and the method further comprises rotating the infrared laser beam using the rotatable scanner such that the annular infrared beam spot rotates when translating along the imaging surface of the transparent workpiece.

7. The method of claim 4, where the infrared laser beam is directed through a beam conditioning element thereby altering a cross-sectional beam profile of the infrared laser beam.

8. The method of claim 1, wherein a spacing between adjacent defects is from about 1 microns to 30 microns.

9. The method of claim 1, wherein:
    an outer diameter of the annular infrared beam spot is from about 0.5 mm to about 20 mm; and
    an inner diameter of the annular infrared beam spot is from about 5% to about 95% of the outer diameter.

10. The method of claim 1, wherein the annular infrared beam spot and the pulsed laser beam spot are coaxial on the imaging surface of the transparent workpiece.

11. The method of claim 1, wherein:
    the annular infrared beam spot and the transparent workpiece are translated relative to one another at a speed from about 1 mm/s to about 10 m/s;
    the pulsed laser beam focal line and the transparent workpiece are translated relative to each other at a speed that is equal to the speed of relative motion between the annular infrared beam spot and the transparent workpiece.

12. The method of claim 1, wherein the infrared laser beam has a power of from about 20 W to about 1000 W.

13. The method of claim 1, wherein:
    a spacing between adjacent defects of the contour line is from about 7 microns to about 12 microns; and the pulsed laser beam produces pulse bursts with from about 5 sub-pulses per pulse burst to about 15 sub-pulses per pulse burst and the pulse burst energy is from about 400 µJ per pulse burst to about 600 micro Joules per pulse burst.

14. The method of claim 1, wherein the pulsed laser beam produces pulse bursts and the sub-pulses of the pulse bursts have a duration of from about 1 picosecond to about 100 picoseconds and a repetition rate in a range of from about 10 kHz and about 3 MHz.

15. The method of claim 1, wherein the pulsed laser beam focal line has an average spot diameter in a range of from about 0.1 micron to about 10 microns.

* * * * *

UNITED STATES PATENT AND TRADEMARK OFFICE
CERTIFICATE OF CORRECTION

| | |
|---|---|
| PATENT NO. | : 10,906,832 B2 |
| APPLICATION NO. | : 16/057284 |
| DATED | : February 2, 2021 |
| INVENTOR(S) | : Marina Irmgard Heiss et al. |

It is certified that error appears in the above-identified patent and that said Letters Patent is hereby corrected as shown below:

On the Title Page

On page 2, in Column 2, item (56), Other Publications, Line 1, delete "Wrriten" and insert -- Written --, therefor.

In the Claims

In Column 24, Line 45, Claim 8, delete "1 microns" and insert -- 1 micron --, therefor.

Signed and Sealed this
First Day of August, 2023

Katherine Kelly Vidal
*Director of the United States Patent and Trademark Office*